US010902314B2

(12) United States Patent
Huang

(10) Patent No.: US 10,902,314 B2
(45) Date of Patent: Jan. 26, 2021

(54) NEURAL NETWORK-BASED CLASSIFICATION METHOD AND CLASSIFICATION DEVICE THEREOF

(71) Applicant: Industrial Technology Research Institute, Hsinchu (TW)

(72) Inventor: Mao-Yu Huang, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 199 days.

(21) Appl. No.: 16/182,619

(22) Filed: Nov. 7, 2018

(65) Prior Publication Data
US 2020/0090028 A1  Mar. 19, 2020

(30) Foreign Application Priority Data

Sep. 19, 2018 (TW) .............. 107132968 A

(51) Int. Cl.
*G06N 3/04* (2006.01)
*G06K 9/32* (2006.01)
(Continued)

(52) U.S. Cl.
CPC ......... *G06N 3/0454* (2013.01); *G06K 9/3241* (2013.01); *G06K 9/6267* (2013.01);
(Continued)

(58) Field of Classification Search
None
See application file for complete search history.

(56) References Cited

U.S. PATENT DOCUMENTS 9,697,444 B2   7/2017  Wu et al.
9,779,330 B2  10/2017  Wellington et al.
(Continued)

FOREIGN PATENT DOCUMENTS

CN    106062774    10/2016
CN    106844739     6/2017
(Continued)

OTHER PUBLICATIONS

Ren, Shaoqing, et al., "Faster r-cnn: Towards real-time object detection with region proposal networks," Advances in neural information processing systems, 2015, pp. 1-9.
(Continued)

*Primary Examiner* — Kim Y Vu
*Assistant Examiner* — Nathan J Bloom
(74) *Attorney, Agent, or Firm* — JCIPRNET

(57) ABSTRACT

A neural network-based classification method, including: obtaining a neural network and a first classifier; inputting input data to the neural network to generate a feature map; cropping the feature map to generate a first cropped part and a second cropped part of the feature map; inputting the first cropped part to the first classifier to generate a first probability vector; inputting the second cropped part to a second classifier to generate a second probability vector, wherein weights of the first classifier are shared with the second classifier; and performing a probability fusion on the first probability vector and the second probability vector to generate an estimated probability vector for determining a class of the input data.

21 Claims, 16 Drawing Sheets

(51) Int. Cl.
*G06K 9/62* (2006.01)
*G06K 9/68* (2006.01)
*G06T 7/11* (2017.01)
*G06N 20/20* (2019.01)
*G06N 3/08* (2006.01)

(52) U.S. Cl.
CPC ........... *G06K 9/6277* (2013.01); *G06K 9/685* (2013.01); *G06N 3/08* (2013.01); *G06N 20/20* (2019.01); *G06T 7/11* (2017.01); *G06K 2009/6864* (2013.01); *G06N 3/0472* (2013.01); *G06N 3/088* (2013.01); *G06T 2207/20084* (2013.01)

(56) References Cited

U.S. PATENT DOCUMENTS

| | | | |
|---|---|---|---|
| 9,916,679 | B2 | 3/2018 | lynn et al. |
| 9,996,890 | B1* | 6/2018 | Cinnamon ............ G06T 1/0007 |
| 2002/0122596 | A1* | 9/2002 | Bradshaw .............. G06K 9/685 382/226 |
| 2014/0355879 | A1* | 12/2014 | Agosta .................... G06T 7/143 382/170 |
| 2015/0063688 | A1* | 3/2015 | Bhardwaj ............ G06K 9/3258 382/159 |
| 2016/0019458 | A1 | 1/2016 | Kaufhold |
| 2016/0140436 | A1 | 5/2016 | Yin et al. |
| 2016/0163035 | A1 | 6/2016 | Chang et al. |
| 2016/0335795 | A1 | 11/2016 | Flynn et al. |
| 2017/0213070 | A1 | 7/2017 | Aghamohammadi et al. |
| 2018/0032840 | A1 | 2/2018 | Yu et al. |
| 2018/0032846 | A1* | 2/2018 | Yang .................. G06K 9/4604 |
| 2018/0276845 | A1* | 9/2018 | Bjorgvinsdottir .... G06K 9/6265 |
| 2019/0102601 | A1* | 4/2019 | Karpas .................. G06N 3/084 |
| 2020/0074154 | A1* | 3/2020 | el Kaliouby ....... G06K 9/00288 |
| 2020/0175352 | A1* | 6/2020 | Cha ....................... G06T 7/0004 |

FOREIGN PATENT DOCUMENTS

| | | |
|---|---|---|
| CN | 107316058 | 11/2017 |
| CN | 107358176 | 11/2017 |
| CN | 107481295 | 12/2017 |
| EP | 3158498 | 4/2017 |
| EP | 3295368 | 3/2018 |
| GB | 2549554 | 10/2017 |
| KR | 1020110039218 | 4/2011 |
| TW | 374889 | 11/1999 |
| TW | 200529794 | 9/2005 |
| TW | 201234042 | 8/2012 |
| TW | 201732690 | 9/2017 |
| TW | 201800057 | 1/2018 |
| WO | 2016074247 | 5/2016 |
| WO | 2016183464 | 11/2016 |
| WO | 2017127218 | 7/2017 |
| WO | 2017203262 | 11/2017 |

OTHER PUBLICATIONS

Shen, Wei, et al. "Multi-crop convolutional neural networks for lung nodule malignancy suspiciousness classification," Pattern Recognition, 61, 2017, pp. 663-673.

Simonyan, et al., "Very deep convolutional networks for large-scale image recognition," arXiv preprint arXiv:1409.1556, 2015, pp. 1-14.

Sermanet, Pierre, et al., "Overfeat: Integrated recognition, localization and detection using convolutional networks," arXiv preprint arXiv:1312.6229, 2013, pp. 1-16.

"Office Action of Taiwan Counterpart Application," dated Nov. 27, 2019, p. 1-p. 14.

* cited by examiner

NEURAL NETWORK-BASED CLASSIFICATION METHOD AND CLASSIFICATION DEVICE THEREOF

CROSS-REFERENCE TO RELATED APPLICATION

This application claims the priority benefit of Taiwan application serial no. 107132968, filed on Sep. 19, 2018. The entirety of the above-mentioned patent application is hereby incorporated by reference herein and made a part of this specification.

BACKGROUND

Technical Field

The disclosure relates to a neural network-based classification method and a classification device thereof.

Description of Related Art

In the field of image recognition, the deep neural network (DNN) has become one of the commonly used methods. By increasing the depth of the neural network (NN) and using a large amount of labeled data to train the weight parameters of the layers, the deep neural network can achieve accurate classification results. However, the production of labeled data requires a lot of manpower. To increase the diversity of labeled data, the multi-crop evaluation technique has been proposed. The multi-crop evaluation technique can crop a single image into a plurality of cropped parts and input the cropped parts respectively to corresponding classifiers.

While a classification device that uses the multi-crop evaluation technique can achieve a lower error rate, the computation amount is increased and more time cost is consumed. Therefore, how to reduce the computational capacity and the time cost consumed in the application of the multi-crop neural network is one of the areas to be researched by people skilled in the art.

SUMMARY

An embodiment of the disclosure provides a neural network-based classification device including a storage medium and a processor. The storage medium stores a plurality of modules. The processor is coupled to the storage medium. The processor accesses and executes the modules of the storage medium. The modules include: a neural network, generating a feature map according to input data; a cropping layer, cropping the feature map to generate a first cropped part and a second cropped part of the feature map; a first classifier, generating a first probability vector according to the first cropped part; a second classifier, generating a second probability vector according to the second cropped part, wherein weights of the first classifier are shared with the second classifier; and a fusion layer, performing a probability fusion on the first probability vector and the second probability vector to generate an estimated probability vector for determining a class of the input data.

An embodiment of the disclosure provides a neural network-based classification method including the following steps. A neural network and a first classifier are obtained. Input data is input to the neural network to generate a feature map. The feature map is cropped to generate a first cropped part and a second cropped part of the feature map. The first cropped part is input to the first classifier to generate a first probability vector. The second cropped part is input to a second classifier to generate a second probability vector, wherein weights of the first classifier are shared with the second classifier. A probability fusion is performed on the first probability vector and the second probability vector to generate an estimated probability vector for determining a class of the input data.

An embodiment of the disclosure provides a neural network-based classification device suitable for classifying appearance defects of objects. The classification device includes an automated optical inspection equipment and a server. The automated optical inspection equipment obtains image data of wafers. The server includes a storage medium and a processor. The server is coupled to the automated optical inspection equipment and receives the image data. The storage medium stores a plurality of modules. The processor is coupled to the storage medium and accesses and executes the modules of the storage medium. The modules include: a neural network, generating a feature map according to the image data; a cropping layer, cropping the feature map to generate a first cropped part and a second cropped part of the feature map; a first classifier, generating a first probability vector according to the first cropped part; a second classifier, generating a second probability vector according to the second cropped part, wherein weights of the first classifier are shared with the second classifier; and a fusion layer, performing a probability fusion on the first probability vector and the second probability vector to generate an estimated probability vector for determining a class of the image data.

To provide a further understanding of the aforementioned and other contents of the disclosure, exemplary embodiments, together with the reference drawings, are described in detail below.

DESCRIPTION OF THE EMBODIMENTS

Figure 1:
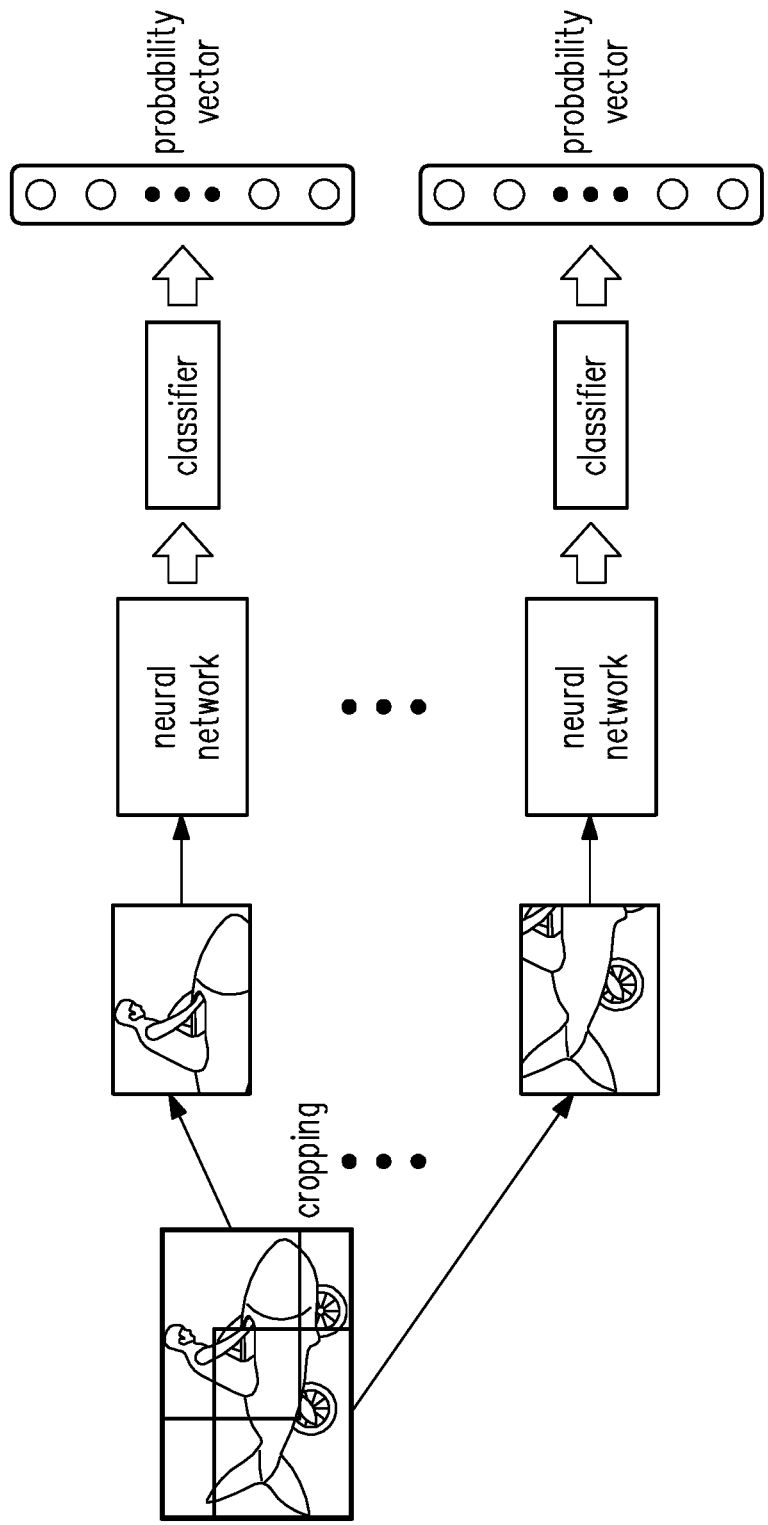
FIG. 1 is a schematic diagram of a classification device based on a multi-crop neural network.

FIG. 1 is a schematic diagram of a classification device based on a multi-crop neural network. The classification device of FIG. 1 crops one single image into a plurality of different cropped parts (for example, cropping the upper-right corner of the image into an upper-right-corner cropped part and cropping the lower-left corner of the image into a lower-left-corner cropped part). After the cropped parts of the image are respectively input to the corresponding neural networks and classifiers, a plurality of prediction scores corresponding to the cropped parts may be generated. The prediction score may be in many different forms. For example, in the embodiment of FIG. 1, the prediction score is presented in the form of a probability vector, but the disclosure is not limited thereto. A probability vector obtained by performing a probability fusion on the probability vectors (i.e., the prediction scores) may then serve as a basis for classifying the image.

Compared to the neural network using the 1-crop evaluation technique, the neural network using the multi-crop evaluation technique could achieve a lower error rate. Table 1 shows the comparison of the top-1 error rate and the top-5 error rate between the 1-crop neural network framework and the 10-crop neural network framework using the ResNet neural network model.

TABLE 1

| Neural network model | 1-crop Error rate | | 10-crop Error rate | |
|---|---|---|---|---|
| | top-1 | top-5 | top-1 | top-5 |
| ResNet-50 | 24.7% | 7.8% | 22.9% | 6.7% |
| ResNet-101 | 23.6% | 7.1% | 21.8% | 6.1% |
| ResNet-152 | 23.0% | 6.7% | 21.4% | 5.7% |

In Table 1, ResNet-50, ResNet-101, and ResNet-152 respectively represent the residual neural network (ResNet) models with 50 convolutional layers, 101 convolutional layers, and 152 convolutional layers. According to Table 1, compared to increasing the number of the convolutional layers of the neural network, using the multi-crop evaluation technique could bring about a more significant improvement in the error rate. For example, the top-1 error rate of ResNet-50 is 24.7%. If the number of the convolutional layers is increased to 101 (i.e., ResNet-101), the top-1 error rate could be improved to 23.6%. In comparison, with the number of the convolutional layers maintained at 50, if the ResNet-50 is applied to the 10-crop neural network framework, the top-1 error rate could be improved to 22.9%. Namely, without significantly increasing the number of the convolutional layers, the multi-crop evaluation technique could achieve the same or even better accuracy compared to significantly increasing the number of the convolutional layers.

Next, taking the Inception Family neural network model as an example, Table 2 shows the comparison of the top-1 error rate and the top-5 error rate between the 1-crop neural network framework and the 12-crop neural network framework using the Inception Family neural network model.

TABLE 2

| Neural network model | 1-crop Error rate | | 12-crop Error rate | |
|---|---|---|---|---|
| | top-1 | top-5 | top-1 | top-5 |
| Inception-v3 | 21.2% | 5.6% | 19.8% | 4.6% |
| Inception-ResNet-V1 | 21.3% | 5.5% | 19.8% | 4.6% |
| Inception-v4 | 20.0% | 5.0% | 18.7% | 4.2% |
| Inception-ResNet-V2 | 19.9% | 4.9% | 18.7% | 4.1% |

Taking Inception-v4 as an example, when Inception-v4 is applied to the 1-crop neural network framework, the top-1 error rate is 20.0%. In comparison, when Inception-v4 is applied to the 12-crop neural network framework, the top-1 error rate is improved to 18.7%. Namely, the multi-crop neural network framework could significantly improve the error rate.

Figure 2:
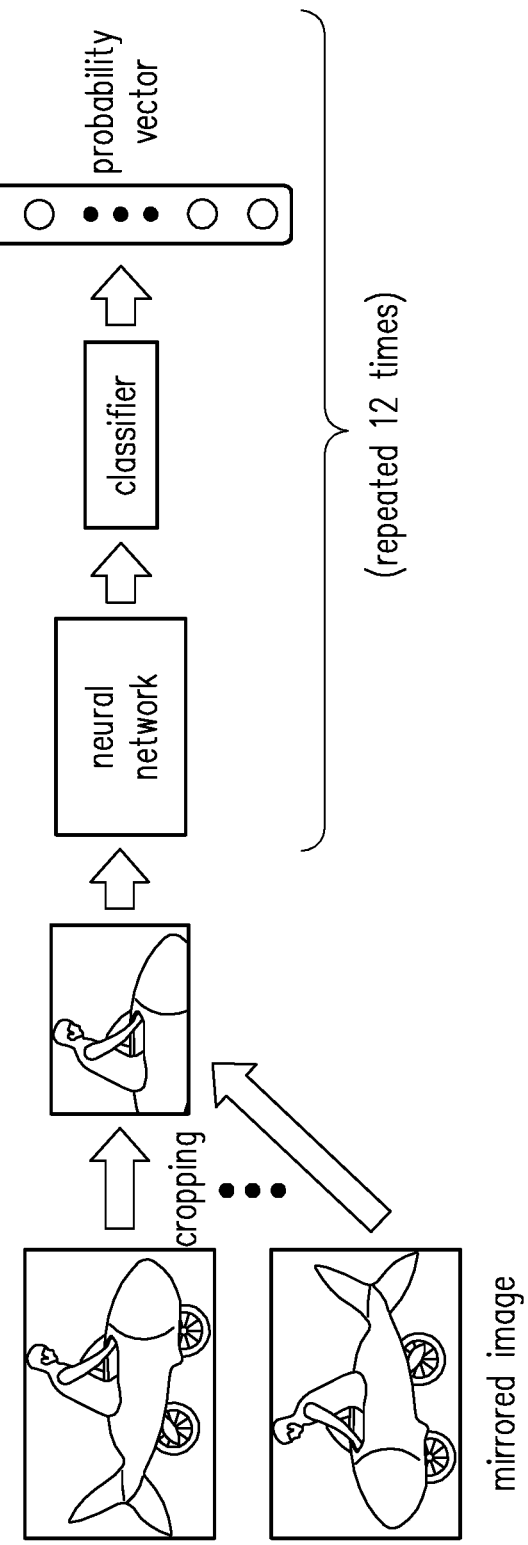
FIG. 2 is a schematic diagram of a classification device based on a 12-crop neural network.

FIG. 2 is a schematic diagram of a classification device based on a 12-crop neural network. The classification device of FIG. 2 respectively crops one single image and its mirrored image into six cropped parts (i.e., 12 cropped parts in total). After each cropped part is sequentially input to a neural network and a classifier, a plurality of prediction scores corresponding to the cropped parts could be generated. In the present embodiment, the prediction scores are presented in the faun of a plurality of probability vectors (i.e., 12 probability vectors). A probability vector obtained by performing a probability fusion on the probability vectors may then serve as a basis for classifying the image. Compared to the traditional method where input data is not cropped, the classification device of FIG. 2 could obtain more accurate classification results. However, since the classification device of FIG. 2 repeatedly performs calculation 12 times using the neural network, the classification device consumes a computational capacity about 12 times that in the conventional method and takes more time.

Figure 3:
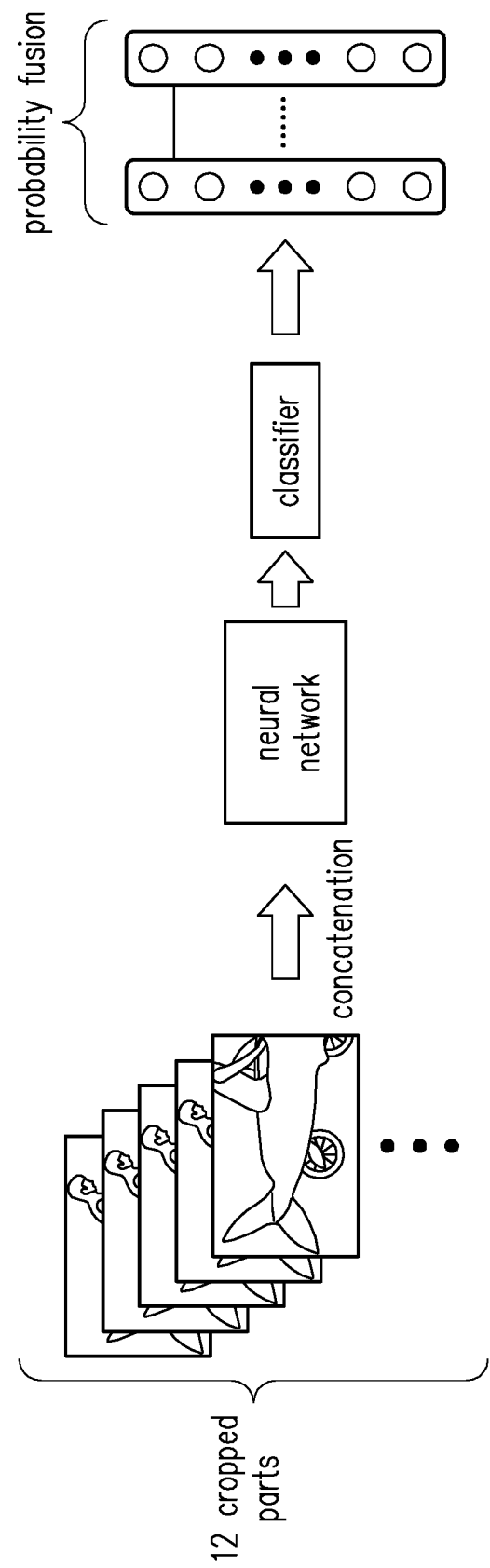
FIG. 3 is a schematic diagram of another classification device based on a 12-crop neural network.

FIG. 3 is a schematic diagram of another classification device based on a 12-crop neural network. The framework of the classification device of FIG. 3 is similar to that of the classification device of FIG. 2 in that both respectively crop one single image and its mirrored image into six cropped parts (i.e., 12 cropped parts in total). However, different from the classification device of FIG. 2 where the 12 cropped parts are individually input to the neural network, in the framework of FIG. 3, the 12 cropped parts are concatenated into a concatenation data, and then the concatenation data is input to the neural network. Next, the output data of the neural network is sliced to generate a plurality of prediction scores corresponding to the cropped parts. In the present embodiment, the prediction scores are presented in the form of a plurality of probability vectors (i.e., 12 probability vectors). A probability vector obtained by performing a probability fusion on the probability vectors may then serve as a basis for classifying the image. The classification device of FIG. 3 performs calculation only once using the neural network, but the huge amount of input data causes the neural network to consume a memory about 12 times that in the conventional method for performing the calculation. Moreover, since different cropped parts may contain overlapping data, using this classification device may consume more computational capacity on recognizing redundant data.

When the number of crops used by the multi-crop neural network is greater than a certain number, the error rate could not be improved by increasing the number of crops. Table 3 shows the comparison of the top-5 error rate of various multi-crop neural network frameworks using the GoogLeNet neural network model.

TABLE 3

Neural network model: GoogLeNet

| Number of models used | Number of crops | Cost (time and computational capacity) | top-5 error rate | Error rate (compared to baseline) |
| --- | --- | --- | --- | --- |
| 1 | 1 | 1 | 10.07% | baseline |
| 1 | 10 | 10 | 9.15% | −0.92% |
| 1 | 144 | 144 | 7.89% | −2.18% |
| 7 | 1 | 1 | 8.09% | −1.98% |
| 7 | 10 | 10 | 7.62% | −2.45% |
| 7 | 144 | 144 | 6.67% | −3.45% |

Taking the 1-crop neural network framework using one single GoogLeNet neural network model as an example, the top-5 error rate is about 10.07%. If one single GoogLeNet is applied to the 10-crop neural network framework, the error rate is significantly improved by about 0.92%. However, to further improve the error rate by about 1.26% (7.89%–9.15%=−1.26%), the number of the cropped parts is increased from 10 to 144. In other words, when the number of crops is increased to a certain number, the improvement in the error rate brought about by the multi-crop evaluation technique will come to be insignificant.

Figure 4A:
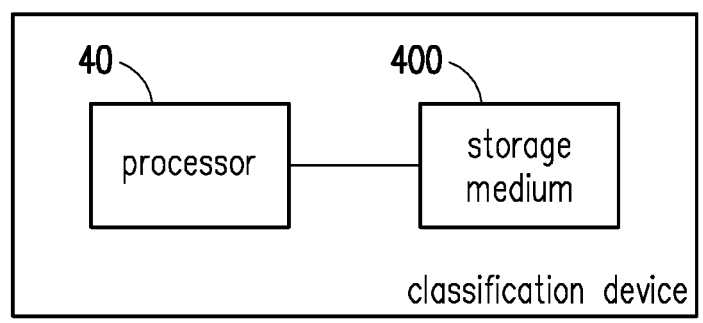
FIG. 4A is a schematic diagram of a neural network-based classification device with a 1-crop framework according to an embodiment of the disclosure.

To further improve the above multi-crop evaluation technique to reduce the calculation time used, the computational capacity used, and the error rate of classification, the disclosure proposes a neural network-based classification device and a classification method. FIG. 4A is a schematic diagram of a neural network-based classification device 4 with a 1-crop framework according to an embodiment of the disclosure. The classification device 4 includes a processor 40 and a storage medium 400. The classification device 4 may be applied to classification of appearance defects of wafers or printed circuit boards, but the disclosure is not limited thereto.

The processor 40 is coupled to the storage medium 400 and could access or execute a plurality of modules stored in the storage medium 400. The processor 40 may be, for example, a central processing unit (CPU), another programmable microprocessor, digital signal processor (DSP), programmable controller, application specific integrated circuit (ASIC) for general or specific purposes, another similar device, or a combination of the above devices, and the disclosure is not limited thereto.

The storage medium 400 is configured to store various software, data, and program codes of various types that are required for the operation of the classification device 4. The storage medium 400 may be, for example, a fixed or movable random access memory (RAM), read-only memory (ROM), flash memory, hard disk drive (HDD), solid state drive (SSD) in any form, a similar device, or a combination of the above devices, and the disclosure is not limited thereto.

Figure 4B:
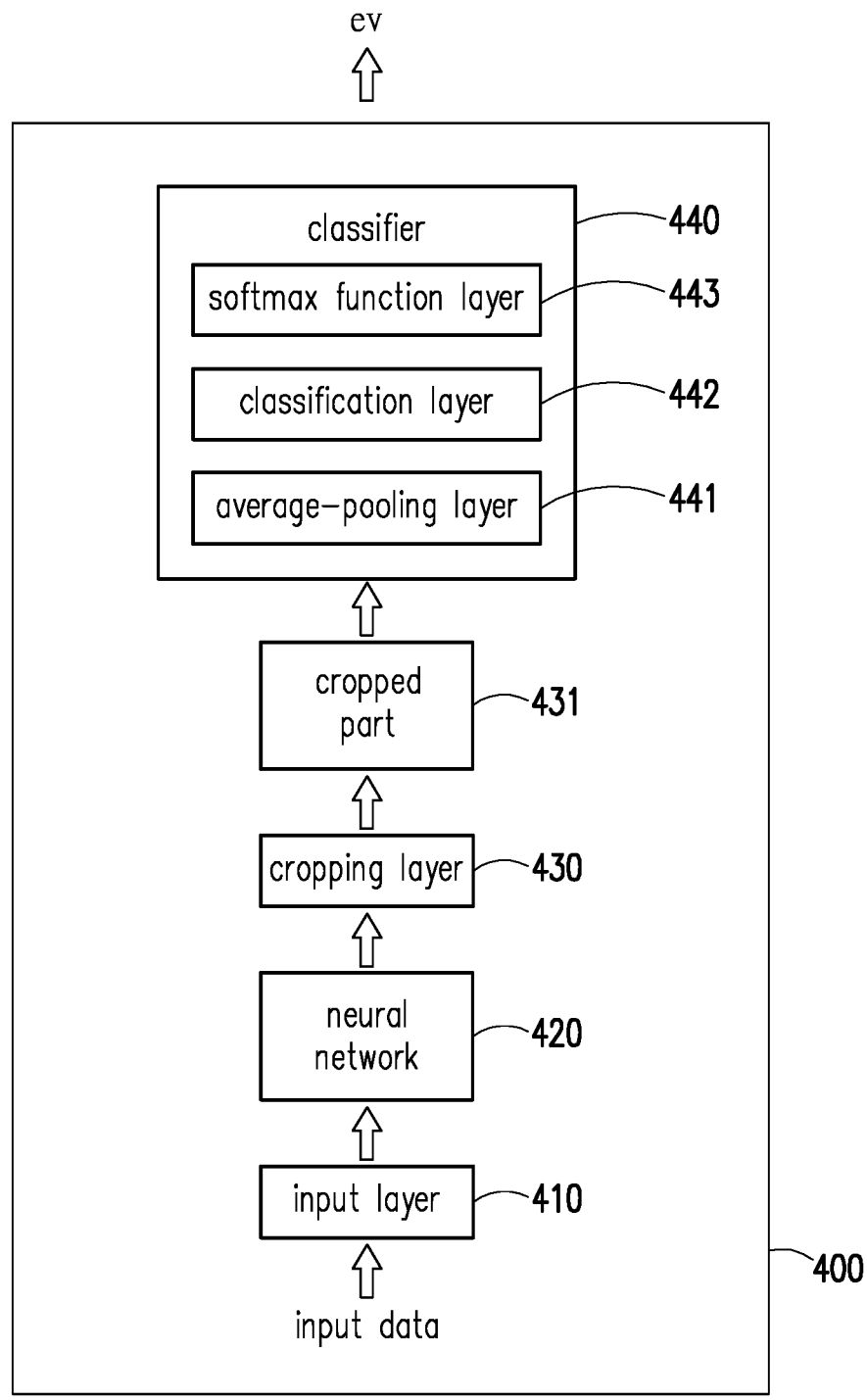
FIG. 4B is a schematic diagram of a storage medium of the classification device according to an embodiment of the disclosure.

In the present embodiment, the modules stored in the storage medium 400 include an input layer 410, a neural network 420, a cropping layer 430, and a classifier 440, as shown in FIG. 4B. FIG. 4B is a schematic diagram of the storage medium 400 of the classification device 4 according to an embodiment of the disclosure. People familiar with the related art shall be aware that the input layer 410, the neural network 420, the cropping layer 430, and the classifier 440 of the disclosure may also be implemented as hardware circuits instead of being implemented as modules stored in the storage medium 400, and the disclosure is not limited thereto.

The input layer 410 is configured to receive input data and input the input data to the neural network 420. The input data may be image data or multimedia data of other types, but the disclosure is not limited thereto. In some embodiments, the input layer 410 may increase the data diversity of the input data (for example, through the operation shown in FIG. 2 or FIG. 3), such that the classification result of the classification device 4 could be improved without increasing the input data. In the industries of wafer fabrication or printed circuit board manufacturing, the input data may be, for example, image data of the appearance of wafers obtained by an automated optical inspection equipment (AOI equipment), or image data of the appearance of printed circuit boards obtained by an automated visual inspection equipment (AVI equipment), but the disclosure is not limited thereto.

Figure 5:
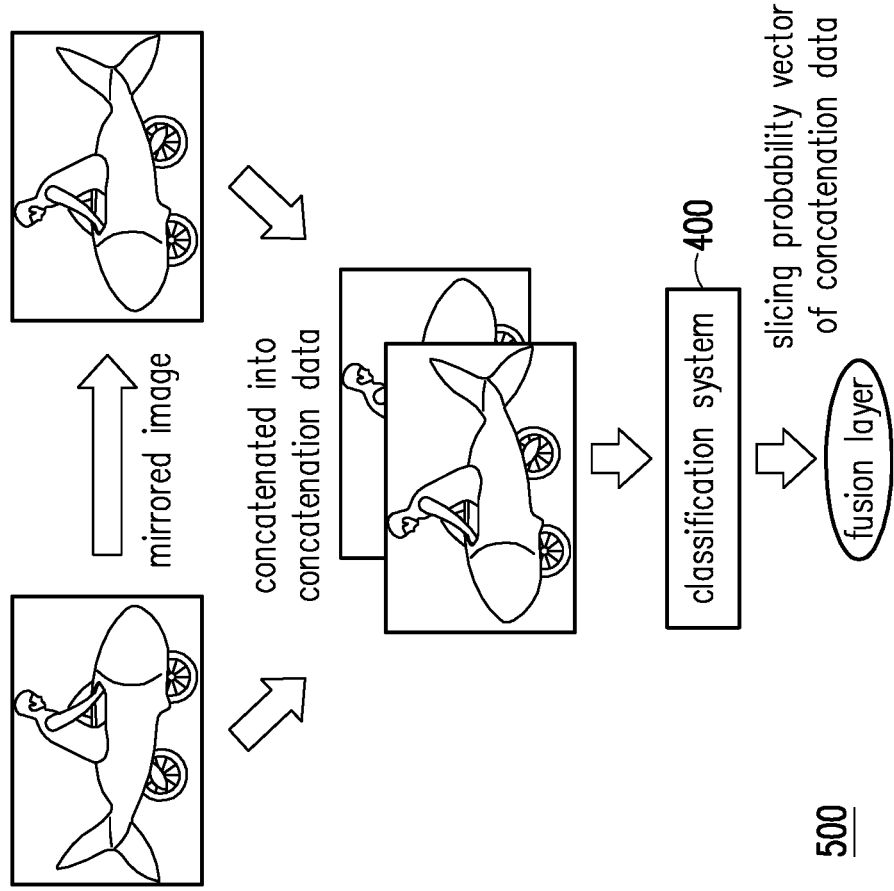
FIG. 5 is a schematic diagram of a method of increasing the diversity of input data according to an embodiment of the disclosure.

FIG. 5 is a schematic diagram of a method 500 of increasing the diversity of the input data according to an embodiment of the disclosure. The method 500 may be selectively applied to the classification device 4, and a classification device 8 and a classification device 13 to be mentioned in subsequent embodiments, but the disclosure is not limited thereto. Taking the case of application to the classification device 4 as an example, assuming that the original input data is an image data, the method 500 could generate a mirrored image data of the image data and concatenate the image data and the mirrored image data into a concatenation data. The concatenation data may then be input to the neural network 420 as new input data. After the concatenation data is input to the classification device 4, a prediction score corresponding to the concatenation data is generated. In the present embodiment, the prediction score is presented in the form of a probability vector, but the disclosure is not limited thereto.

After the probability vector is sliced into two probability vectors respectively corresponding to the image data and the mirrored image data, a probability fusion may be performed on the two probability vectors to generate an estimated probability vector that may be used for determining the class. The method of determining the class of the input data according to the estimated probability vector will be described herein below. Compared to the classification device shown in FIG. 2 or FIG. 3 where the image data is cropped into 12 cropped parts to increase the data diversity, the method 500 uses a small amount of the input data and a simple probability fusion to achieve a classification performance having an accuracy that is not inferior to that of the classification device based on the 12-crop neural network.

Referring back to FIG. 4B, the neural network 420 may receive the input data from the input layer 410 and generate a feature map according to the input data. The neural network 420 may be, for example, a convolutional neural network (CNN). The neural network 420 may also be, for example, a self-encoding neural network, a deep learning neural network, a deep residual learning neural network, a restricted Boltzmann machine (RBM) neural network, a recursive neural network, or a multilayer perceptron (MLP) neural network, and the disclosure is not limited thereto. In the present embodiment, a trained neural network of any type may be used as the neural network 420.

Based on the difference in the dimensions of the convolution kernel, the neural network 420 may output one feature map or output a plurality of feature maps corresponding to different channels (as an example, the following description is based on the case of outputting one feature map). In the present embodiment, any one trained neural network may be obtained as the neural network 420. In other words, it is not required to re-train the neural network 420 used by the classification device 4. Therefore, the time and computational capacity consumed for establishing the neural network could be reduced.

The cropping layer 430 may receive the feature map from the neural network 420 and crop the feature map to generate a cropped part 431 of the feature map. The cropped part 431 may be equivalent to the feature map (namely, the feature map is not cropped) or a subset of the feature map.

Figure 6:
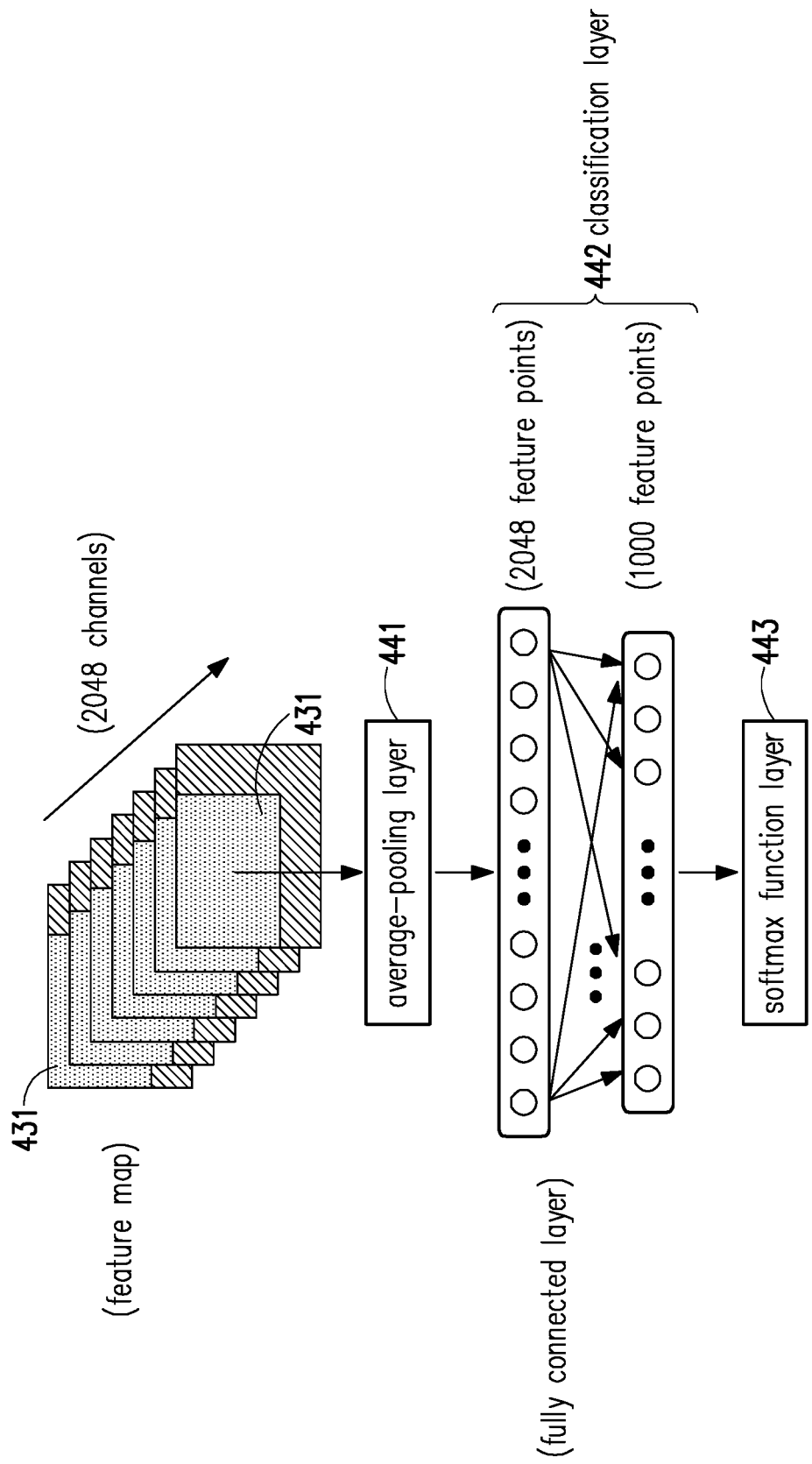
FIG. 6 is a schematic diagram of conversion of a feature map into a probability vector through a classifier according to an embodiment of the disclosure.

The classifier 440 corresponds to the neural network 420. Therefore, when the neural network 420 is a trained neural network, the classifier of the trained neural network may be directly used as the classifier 440. The classifier 440 may receive the cropped part 431 from the cropping layer 430 and generate a probability vector corresponding to the cropped part 431 according to the cropped part 431. Reference may be made to FIG. 6 for the mechanism for generating the probability vector. FIG. 6 is a schematic diagram of conversion of a feature map into a probability vector through the classifier 440 according to an embodiment of the disclosure. The classifier 440 may include an average-pooling (or referred to as crop-average-pooling (CAP)) layer 441, a classification layer 442, and a softmax function layer 443, as shown in FIG. 4B. In some embodiments, the average-pooling layer 441 may be replaced by a pooling layer of any type (e.g., a max-pooling layer), and the disclosure is not limited thereto.

First, the average-pooling layer 441 may receive the cropped parts 431 of the plurality of channels to generate a plurality of feature points respectively corresponding to the channels. For convenience of illustration, it is assumed in the embodiment of FIG. 6 that the feature map has a total of 2048 channels (however, the number of channels of the feature map may be any integer, and the disclosure is not limited thereto), and each channel has the corresponding cropped part 431. The average-pooling layer 441 could generate 2048 feature points respectively corresponding to the 2048 channels according to the cropped parts 431 of the 2048 channels.

Next, the classification layer 442 may receive the feature points (i.e., the 2048 feature points) and convert the feature points into a score vector. Each element in the score vector corresponds to a class, and the classification layer 442 may be a fully connected layer. Specifically, the classification layer 442 may assign weights of the classes to each of the feature points, and may score each of the classes according to the feature points and their weights to generate a plurality of score values respectively corresponding to the classes. The score values may form the score vector. For example, assuming that the classification device 4 could recognize an object as one of 1000 classes, then the 2048 feature points may be mapped to the 1000 classes according to the corresponding weights of the feature points in the classification layer 442 to generate 1000 score values respectively corresponding to the classes according to the 2048 feature points. The 1000 score values may form the score vector of the size 1000×1.

Then, after obtaining the score vector, the softmax function layer 443 may normalize the score vector to generate a probability vector. Each element in the probability vector corresponds to a class and is a real number in the range of 0 to 1. Since it is assumed in the present embodiment that there are 1000 classes in total, the probability vector has 1000 elements (but the disclosure is not limited thereto). Specifically, the softmax function layer 443 could normalize a K-dimensional vector z (e.g., the score vector of the disclosure) containing any real number to generate a K-dimensional real vector $\sigma(z)$ (e.g., the estimated probability vector of the disclosure), such that each element in the real vector $\sigma(z)$ is in the range of 0 to 1, and the sum of all elements is 1. After the score vector is processed by the softmax function layer 443, each element in the score vector is converted into a probability value in the range of 0 to 1 to convert the score vector into an estimated probability vector ev. Specifically, the probability value represents the probability that the input data is the class corresponding to the probability value.

Finally, the classifier 440 may output the estimated probability vector ev for determining the class of the input data. A higher value of an element in the estimated probability vector ev means a higher probability that the input data corresponds to the class of the element and thus a higher probability that the input data is classified in the class. Conversely, a lower value of an element in the estimated probability vector ev means a lower probability that the input data corresponds to the class of the element and thus a lower probability that the input data is classified in the class. In the industries of wafer fabrication or printed circuit board manufacturing, the estimated probability vector ev output by the classifier 400 may be, for example, associated with the class of appearance defects of wafers or the class of appearance defects of printed circuit boards, but the disclosure is not limited thereto.

Figure 7:
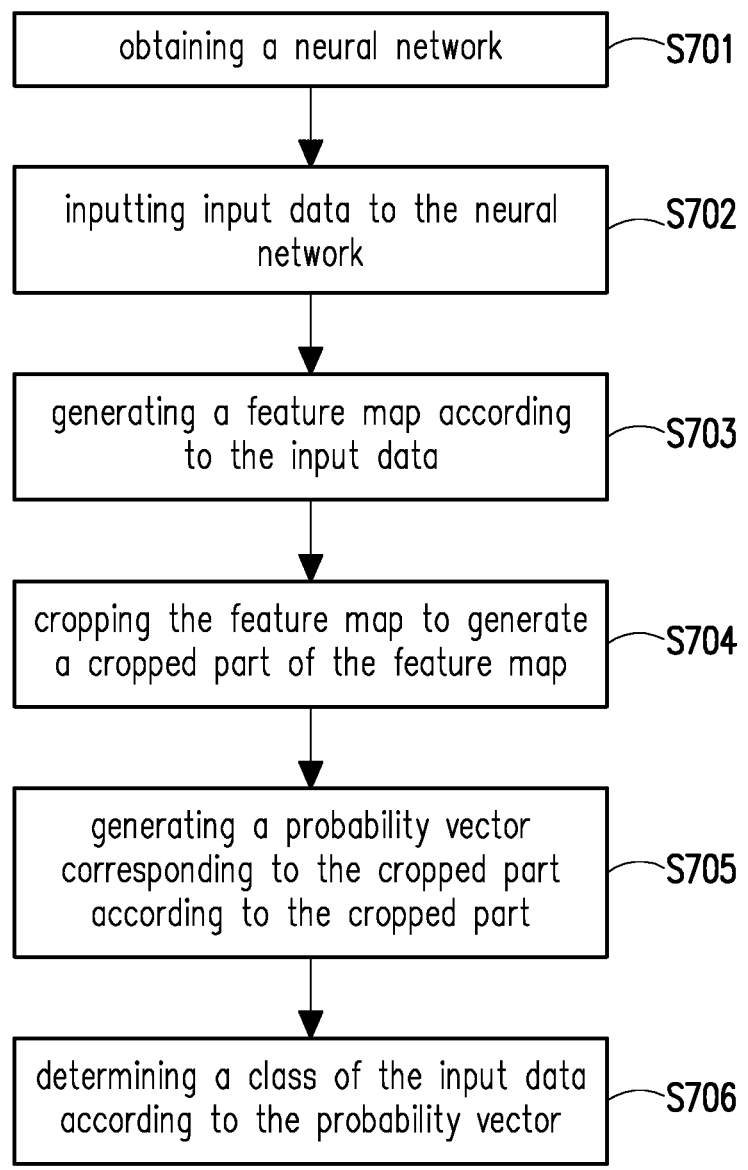
FIG. 7 is a flowchart of a neural network-based classification method according to an embodiment of the disclosure.

FIG. 7 is a flowchart of a neural network-based classification method 700 according to an embodiment of the disclosure, and the classification method 700 is applicable to the classification device 4. In step S701, a neural network is obtained. In step S702, input data is input to the neural network. In step S703, a feature map is generated according to the input data. In step S704, the feature map is cropped to generate a cropped part of the feature map. In step S705, a probability vector corresponding to the cropped part is generated according to the cropped part. In step S706, determining a class of the input data according to the probability vector.

Figure 8A:
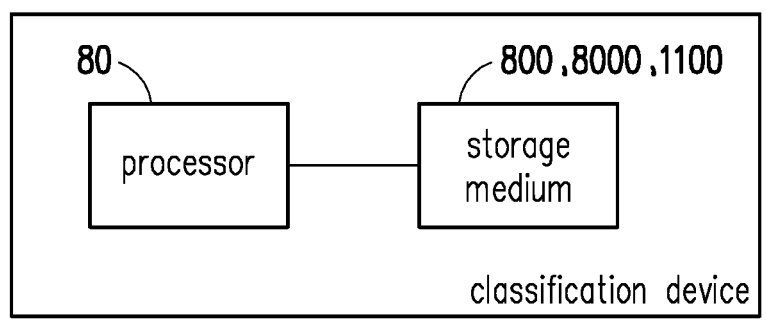
FIG. 8A is a schematic diagram of a neural network-based classification device with a multi-crop framework according to an embodiment of the disclosure.

FIG. 8A is a schematic diagram of a neural network-based classification device 8 with a multi-crop framework according to an embodiment of the disclosure. The classification device 8 includes a processor 80 and a storage medium 800 (or a storage medium 8000 or a storage medium 1100). The classification device 8 may be used to classify appearance defects of wafers or printed circuit boards, but the disclosure is not limited thereto.

The processor 80 is coupled to the storage medium 800 and could access or execute a plurality of modules stored in the storage medium 800. The processor 80 may be, for example, a central processing unit (CPU), another programmable microprocessor, digital signal processor (DSP), programmable controller, application specific integrated circuit (ASIC) for general or specific purposes, another similar device, or a combination of the above devices, and the disclosure is not limited thereto.

The storage medium 800 (or the storage medium 8000 or the storage medium 1100) is configured to store various software, data, and program codes of various types that are required for the operation of the classification device 8. The storage medium 800 (or the storage medium 8000 or the storage medium 1100) may be, for example, a fixed or movable random access memory (RAM), read-only memory (ROM), flash memory, hard disk drive (HDD), solid state drive (SSD) in any form, a similar device, or a combination of the above devices, and the disclosure is not limited thereto.

Figure 8B:
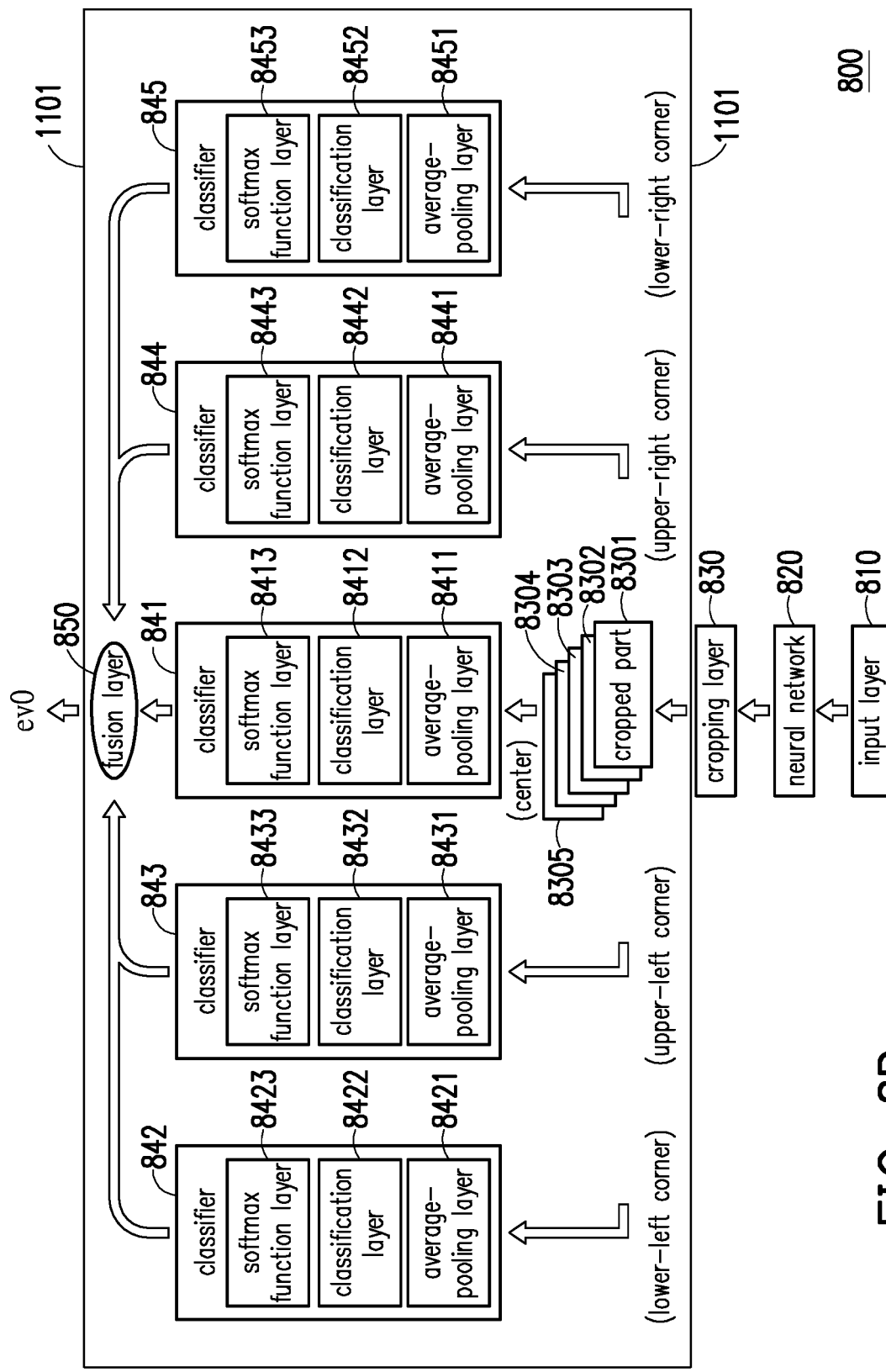
FIG. 8B is a schematic diagram of a storage medium of the classification device according to an embodiment of the disclosure.

FIG. 8B is a schematic diagram of a storage medium 800 of the classification device 8 according to an embodiment of the disclosure (the storage medium 8000 or the storage medium 1100 will be described in subsequent embodiments herein). The storage medium 800 includes an input layer 810, a neural network 820, a cropping layer 830, a plurality of classifiers (classifiers 841, 842, 843, 844, and 845), and a fusion layer 850. People familiar with the related art shall be aware that the input layer 810, the neural network 820, the cropping layer 830, the plurality of classifiers (the classifiers 841, 842, 843, 844, and 845), and the fusion layer 850 of the disclosure may also be implemented as hardware circuits instead of being implemented as modules stored in the storage medium 800, and the disclosure is not limited thereto.

The input layer 810 is configured to receive input data and input the input data to the neural network 820. The input data may be image data or multimedia data of other types, but the disclosure is not limited thereto. In some embodiments, the input layer 810 may increase the data diversity of the input data (for example, through the operation shown in FIG. 2 or FIG. 3), such that the classification result of the classification device 8 could be improved without increasing the input data.

The neural network 820 may receive the input data from the input layer 810 and generate a feature map according to the input data. The neural network 820 may be, for example, a convolutional neural network. The neural network 820 may also be, for example, a self-encoding neural network, a deep learning neural network, a deep residual learning neural network, a restricted Boltzmann machine neural network, a recursive neural network, or a multilayer perceptron neural network, and the disclosure is not limited thereto. In the present embodiment, a trained neural network of any type may be used as the neural network 820.

The cropping layer 830 may receive the feature map from the neural network 820 and crop the feature map to generate a plurality of cropped parts of the feature map. In the present embodiment, the cropping layer 830 crops the feature map into five different cropped parts (cropped parts 8301, 8302, 8303, 8304, and 8305). However, parameters such as the number and size of the cropped parts and their positions corresponding to the feature map may be adjusted by the user according to the requirements, and the disclosure is not limited thereto. In the present embodiment, the cropped part 8301 is a cropped part corresponding to the center of the feature map, the cropped part 8302 is a cropped part corresponding to the lower-left corner of the feature map, the cropped part 8303 is a cropped part corresponding to the upper-left corner of the feature map, the cropped part 8304 is a cropped part corresponding to the upper-right corner of the feature map, and the cropped part 8305 is a cropped part corresponding to the lower-right corner of the feature map.

In the present embodiment, each cropped part corresponds to a dedicated classifier. Since it is assumed in the embodiment of FIG. 8B that the feature map is cropped into five cropped parts, the storage medium 800 includes five classifiers (i.e., the classifiers 841, 842, 843, 844, and 845, respectively) in total. Specifically, the classifier 841 corresponds to the cropped part 8301, the classifier 842 corresponds to the cropped part 8302, the classifier 843 corresponds to the cropped part 8303, the classifier 844 corresponds to the cropped part 8304, and the classifier 845 corresponds to the cropped part 8305.

The function of the classifiers 841, 842, 843, 844, and 845 is substantially the same as that of the classifier 440. Taking the classifier 841 as an example, the classifier 841 may correspond to the neural network 820. Therefore, when the neural network 820 is a trained neural network, the classifier of the trained neural network may be directly used as the classifier 841. The classifier 841 may receive the cropped part 8301 from the cropping layer 830 and generate a probability vector corresponding to the cropped part 8301 according to the cropped part 8301. Similarly, the classifier 842 may receive the cropped part 8302 from the cropping layer 830 and generate a probability vector corresponding to the cropped part 8302 according to the cropped part 8302. The function of the classifiers 843, 844, and 845 may be analogically inferred in this manner.

The difference between the classifiers 841, 842, 843, 844, and 845 and the classifier 440 lies in that the classifiers 841, 842, 843, 844, and 845 may be implemented with a weight sharing technique. In the present embodiment, the storage medium 800 may directly use a trained neural network of any type and a corresponding classifier respectively as the neural network 820 and the classifier 841. Therefore, the weights of the classifier 841 are known (namely, they could be obtained without calculation). By implementing weight sharing, the weights of classifier 841 could be shared with the classifiers 842, 843, 844, and 845.

Specifically, weights identical to the weights of the classifier 841 may be applied to the classifiers 842, 843, 844, and 845. Taking the classifier 841 and the classifier 842 as an example, the weights (which are assumed to be a weight matrix w1) of the various classes contained in a classification layer 8412 of the classifier 841 may be assigned to the feature points of the corresponding cropped part 8301, and a score vector corresponding to the cropped part 8301 may be generated according to the feature points and their weights. In the weight sharing mechanism, a classification layer 8422 may assign exactly the same weights (which are assumed to be a weight matrix w2, wherein w1=w2) as the classification layer 8412 to the feature points of the corresponding cropped part 8302, and a score vector corresponding to the cropped part 8302 may be generated according to the feature points and their weights. In other words, in the present embodiment, the classification device 8 does not re-train the neural network or the classifier to adapt to a new cropped part of a feature map (adding a new cropped part is equivalent to changing the framework of the cropping layer 830). For example, assuming that the neural network 420 and the classifier 440 of the classification device 4 have been trained, if the user would like to change the classification device 4 (or the storage medium 400) to a framework such as the classification device 8 (or the storage medium 800), the user could directly apply the neural network 420 of the classification device 4 to the neural network 820 of the classification device 8, and directly apply the classifier 440 to the classifier 841 to further apply the weights of the classifier 841 to the classifiers 842, 843, 844, and 845 through weight sharing. The neural network 820 and the classifiers 841 to 845 could then be generated without training.

With the exception of the implementation the above weight sharing technique, the method of generating a probability vector by the classifiers 841, 842, 843, 844, and 845 is substantially the same as the method of generating a probability vector by the classifier 440 and is thus not repeatedly described here. The classifiers 841, 842, 843, 844, and 845 may respectively generate a plurality of probability vectors corresponding to the cropped parts 8301, 8302, 8303, 8304, and 8305.

The fusion layer 850 may receive the probability vectors of the cropped parts and perform a probability fusion on the probability vectors to generate an estimated probability vector ev0 for determining a class of the input data. In the present embodiment, the fusion layer 850 may perform a probability fusion on the probability vectors generated by the classifiers 841, 842, 843, 844, and 845 to generate the estimated probability vector ev0 for determining the class of the input data. The probability fusion may be, for example, one of a weighted average fusion, a maximum fusion, and a random fusion, and the disclosure is not limited thereto.

When the weighted average fusion is used, the fusion layer 850 takes an average of the probability vectors generated by the classifiers 841, 842, 843, 844, and 845 by using the same weight coefficient to generate the estimated probability vector ev0 (method 1). However, the fusion layer 850 may also take an average of the probability vectors generated by the classifiers 841, 842, 843, 844, and 845 by using different weight coefficients to generate the estimated probability vector ev0 (method 2).

When the maximum fusion is used, the fusion layer 850 selects an element having a maximum value from the probability vectors generated by the classifiers 841, 842, 843, 844, and 845, and determines the probability vector corresponding to the element as the estimated probability vector ev0 (method 3).

When the random fusion is used, the fusion layer 850 randomly selects one of the probability vectors generated by the classifiers 841, 842, 843, 844, and 845 as the estimated probability vector ev0 (method 4). Alternatively, the fusion layer 850 randomly discards a predetermined number of second elements in the probability vectors generated by the classifiers 841, 842, 843, 844, and 845, and then performs one of method 1 to method 4. Specifically, the predetermined number of the second elements respectively correspond to one of the classes (method 5).

A higher value of an element in the estimated probability vector ev0 means a higher probability that the input data corresponds to the class of the element and thus a higher probability that the input data is classified in the class. Conversely, a lower value of an element in the estimated probability vector ev0 means a lower probability that the input data corresponds to the class of the element and thus a lower probability that the input data is classified in the class. In an embodiment, an element having the largest value (a real number in the range of 0 to 1) may be selected from the estimated probability vector ev0, and the input data may be classified in the class corresponding to the element having the largest value.

Figure 8C:
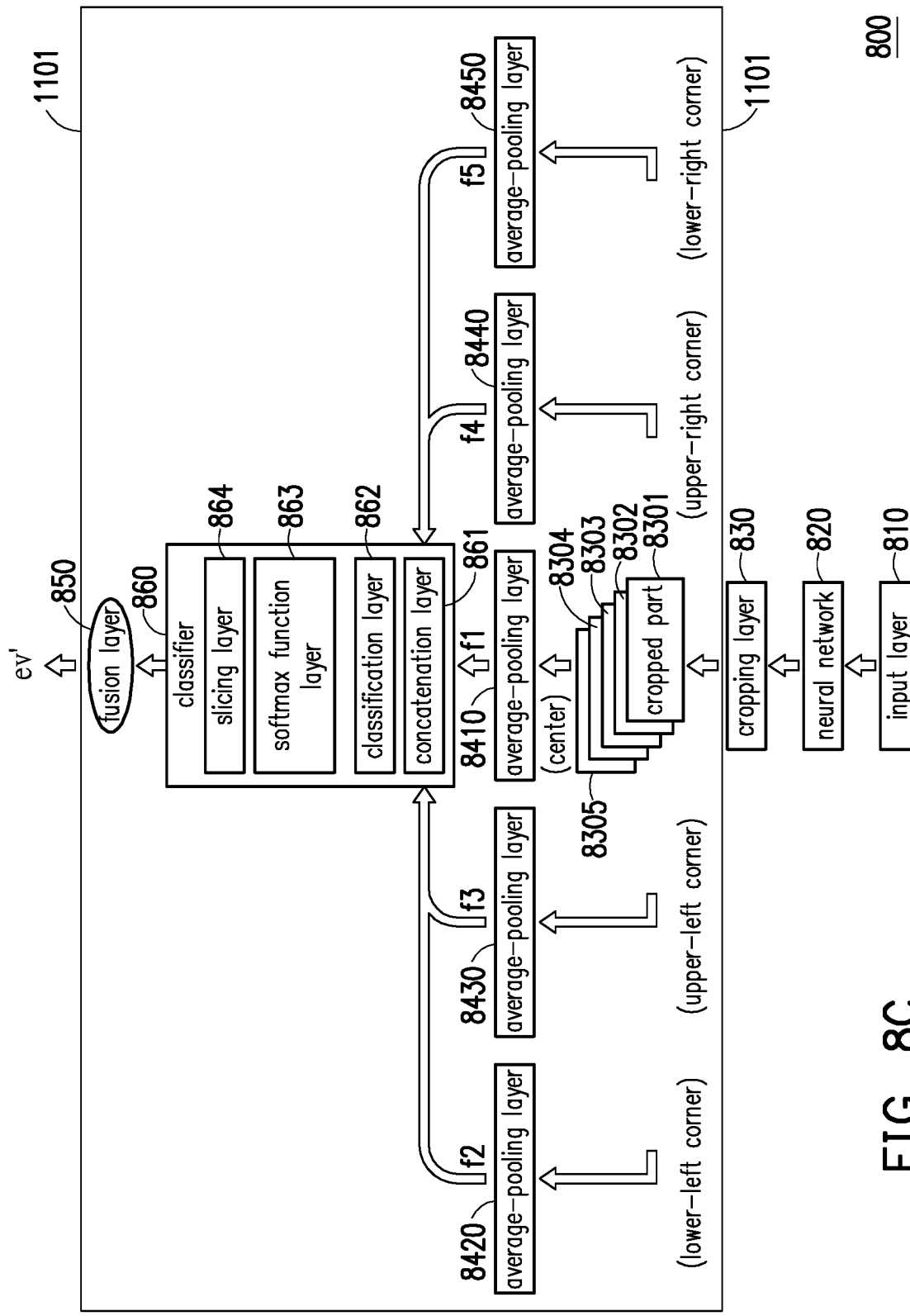
FIG. 8C is a schematic diagram of another storage medium of the classification device according to an embodiment of the disclosure.

FIG. 8C is a schematic diagram of another storage medium 8000 of the classification device 8 according to an embodiment of the disclosure. The storage medium 8000 includes an input layer 810, a neural network 820, a cropping layer 830, a plurality of average-pooling layers 8410, 8420, 8430, 8440, and 8450, a classifier 860, and a fusion layer 850. The functions of the input layer 810, the neural network 820, and the cropping layer 830 have been described in detail above and are thus not repeatedly described here.

After the cropping layer 830 crops the feature map into five different cropped parts (i.e., the cropped parts 8301, 8302, 8303, 8304, and 8305), each cropped part corresponds to a dedicated average-pooling layer (i.e., the average-pooling layers 8410, 8420, 8430, 8440 and 8450, respectively). Specifically, the average-pooling layer 8410 corresponds to the cropped part 8301, the average-pooling layer 8420 corresponds to the cropped part 8302, the average-pooling layer 8430 corresponds to the cropped part 8303, the average-pooling layer 8440 corresponds to the cropped part 8304, and the average-pooling layer 8450 corresponds to the cropped part 8305.

The functions of the average-pooling layers 8410, 8420, 8430, 8440, and 8450 are identical. Taking the average-pooling layer 8410 as an example, the average-pooling layer 8410 may receive the cropped part 8301 corresponding to one or more channels to generate a plurality of feature points respectively corresponding to the channels. One or more feature points generated by the average-pooling layer 8410 may be combined into a feature vector f1 and input to the classifier 860. Similarly, one or more feature points generated by the average-pooling layer 8420 may be combined into a feature vector f2 and input to the classifier 860, one or more feature points generated by the average-pooling layer 8430 may be combined into a feature vector f3 and input to the classifier 860, one or more feature points generated by the average-pooling layer 8440 may be combined into a feature vector f4 and input to the classifier 860, and one or more feature points generated by the average-pooling layer 8450 may be combined into a feature vector f5 and input to the classifier 860.

The classifier 860 may include a concatenation layer 861, a classification layer 862, a softmax function layer 863, and a slicing layer 864. The concatenation layer 861 may concatenate the received feature vectors (i.e., the feature vectors f1, f2, f3, f4, and f5) into a concatenation feature vector, and then input the concatenation feature vector to the classification layer 862.

The classification layer 862 may convert the concatenation feature vector formed by concatenating the feature vectors f1, f2, f3, f4, and f5 into a score vector. Each element in the score vector corresponds to a class, and the classification layer 862 may be a fully connected layer. Specifically, the classification layer 862 may assign weights of the classes to each of the feature points in the concatenation feature vector, and may score each of the classes according to the feature points and their weights to generate a plurality of score values respectively corresponding to the classes. The score values may form the score vector.

After obtaining the score vector, the softmax function layer 863 may normalize the score vector to generate a probability vector. Each element in the probability vector corresponds to a class and is a real number in the range of 0 to 1. Specifically, the softmax function layer 863 could normalize a K-dimensional vector z (e.g., the score vector of the disclosure) containing any real number to generate a K-dimensional real vector σ(z) (e.g., the estimated probability vector of the disclosure), such that each element in the real vector σ(z) is in the range of 0 to 1, and the sum of all elements is 1. After the score vector is processed by the softmax function layer 863, each element in the score vector is converted into a probability value in the range of 0 to 1 to convert the score vector into a probability vector. Specifically, the probability value represents the probability that the input data is the class corresponding to the probability value.

The slicing layer 864 may slice the probability vector output from the softmax function layer 863 to generate a plurality of prediction scores corresponding to the cropped parts (i.e., the cropped parts 8301, 8302, 8303, 8304, and 8305). In the present embodiment, the prediction scores are presented in the form of a plurality of probability vectors (i.e., five probability vectors respectively corresponding to the cropped parts 8301, 8302, 8303, 8304, and 8305).

The fusion layer 850 may receive the probability vectors of the cropped parts (i.e., the five probability vectors respectively corresponding to the cropped parts 8301, 8302, 8303, 8304, and 8305) and perform a probability fusion on the probability vectors to generate an estimated probability vector ev' for determining a class of the input data. The probability fusion may be, for example, one of a weighted average fusion, a maximum fusion, and a random fusion, and the disclosure is not limited thereto.

Figure 9:
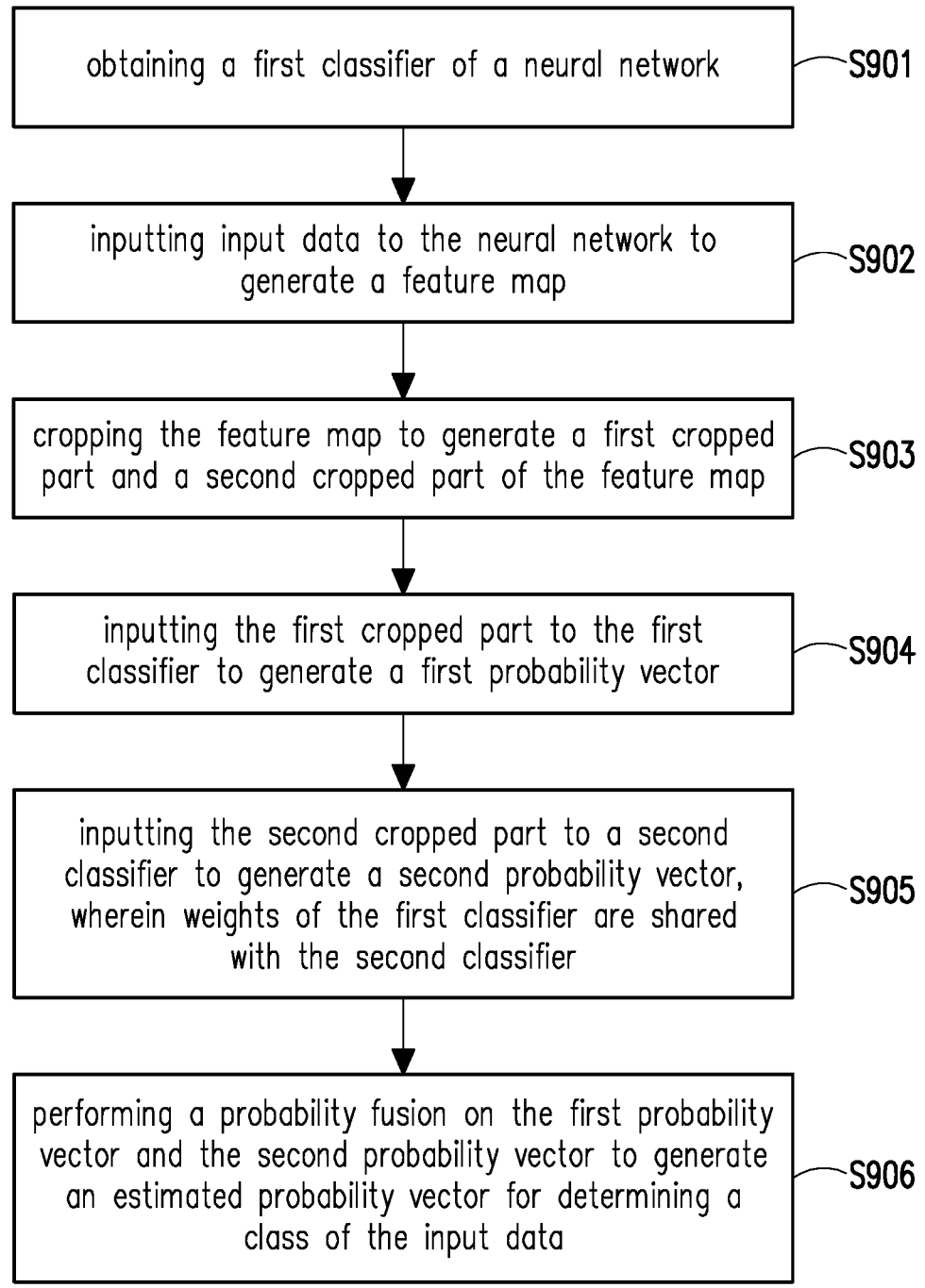
FIG. 9 is a flowchart of a neural network-based classification method according to an embodiment of the disclosure.

FIG. 9 is a flowchart of a neural network-based classification method 900 according to an embodiment of the disclosure, and the classification method 900 is applicable to the classification device 8. In step S901, a neural network and a first classifier are obtained. In step S902, input data is input to the neural network to generate a feature map. In step S903, the feature map is cropped to generate a first cropped part and a second cropped part of the feature map. In step S904, the first cropped part is input to the first classifier to generate a first probability vector. In step S905, the second cropped part is input to a second classifier to generate a second probability vector, and weights of the first classifier are shared with the second classifier. In step S906, a probability fusion is performed on the first probability vector and the second probability vector to generate an estimated probability vector for determining a class of the input data.

Referring back to FIG. 8B, in an embodiment, in the storage medium 800 of the classification device 8, the cropping layer 830 may gradually add the cropped parts instead of directly cropping the feature map into a large number of cropped parts, so that the computational capacity consumed by the classification device 8 could be saved. For example, the cropping layer 830 may receive the feature map from the neural network 820 and crop the feature map to generate the cropped part 8301 and the cropped part 8302 of the feature map. Next, the classifier 841 may generate a first probability vector according to the cropped part 8301, and the classifier 842 may generate a second probability vector according to the cropped part 8302. Then, the fusion layer 850 may perform a probability fusion on the first probability vector and the second probability vector to generate an estimated probability vector ev0 for determining the class of the input data.

In an embodiment, the fusion layer 850 may have a classification threshold value. The classification threshold value is used to determine the estimated probability vector ev0 of which the information amount is not sufficient for determining the class of the input data. For example, if all elements in the estimated probability vector ev0 are smaller than the classification threshold value, the fusion layer 850 determines that the information amount covered by the estimated probability vector ev0 is not sufficient for determining the class of the input data. Therefore, the fusion layer 850 may choose not to output the estimated probability vector ev0.

Assuming that all elements of the estimated probability vector ev0 covering the information of two cropped parts (i.e., the cropped part 8301 and the cropped part 8302) are smaller than the classification threshold value, the cropping layer 830 may further crop the feature map to generate a third cropped part (i.e., the cropped part 8303) of the feature map. Next, the classifier 843 may receive the cropped part 8303 and generate a third probability vector according to the cropped part 8303, and the weights of the classifier 841 are shared with the classifier 843. After obtaining the third probability vector, the fusion layer 850 may perform a probability fusion on the first probability vector, the second probability vector, and the third probability vector to generate a second estimated probability vector (i.e., an updated estimated probability vector ev0). If all elements in the second estimated probability vector are still smaller than the classification threshold value, another new estimated probability vector (i.e., an updated second estimated probability vector) may be obtained by adding a new cropped part, until an element greater than the classification threshold value is present in the new estimated probability vector.

Referring back to FIG. 8C, in an embodiment, the cropping layer 830 in the storage medium 8000 of the classification device 8 may gradually add the cropped parts instead of directly cropping the feature map into a large number of cropped parts, so that the computational capacity consumed by the classification device 8 could be saved. For example, the cropping layer 830 may receive the feature map from the neural network 820 and crop the feature map to generate the cropped part 8301 and the cropped part 8302 of the feature map. Next, the average-pooling layer 8410 may generate a feature vector f1 according to the cropped part 8301, and the average-pooling layer 8420 may generate a feature vector f2 according to the cropped part 8302. Next, the classifier 860 may generate two probability vectors respectively corresponding to the feature vector f1 (or the cropped part 8301) and the feature vector f2 (or the cropped part 8302) according to the feature vector f1 and the feature vector f2. Then, the fusion layer 850 may perform a probability fusion on the two probability vectors generated by the classifier 860 to generate an estimated probability vector ev' for determining the class of the input data.

In an embodiment, the fusion layer 850 may have a classification threshold value. The classification threshold value is used to determine the estimated probability vector ev' of which the information amount is not sufficient for determining the class of the input data. For example, if all elements in the estimated probability vector ev' are smaller than the classification threshold value, the fusion layer 850 determines that the information amount covered by the estimated probability vector ev' is not sufficient for determining the class of the input data. Therefore, the fusion layer 850 may choose not to output the estimated probability vector ev'.

For example, assuming that all elements of the estimated probability vector ev' covering the information of two cropped parts (i.e., the cropped part 8301 and the cropped part 8302) are smaller than the classification threshold value, the cropping layer 830 may further crop the feature map to generate a third cropped part (i.e., the cropped part 8303) of the feature map. Next, the average-pooling layer 8430 may generate a feature vector f3 according to the cropped part 8303. Then, according to the feature vectors f1, f2, and f3, the classifier 860 may generate three probability vectors respectively corresponding to the feature vector f1 (or the cropped part 8301), the feature vector f2 (or the cropped part 8302), and the feature vector f3 (or the cropped part 8303). Next, the fusion layer 850 may perform a probability fusion on the three probability vectors generated by the classifier 860 to generate a second estimated probability vector (i.e., an updated estimated probability vector ev'). If all elements in the second estimated probability vector are still smaller than the classification threshold value, another new estimated probability vector (i.e., an updated second estimated probability vector) may be obtained by adding a new cropped part, until an element greater than the classification threshold value is present in the new estimated probability vector.

Figure 10:
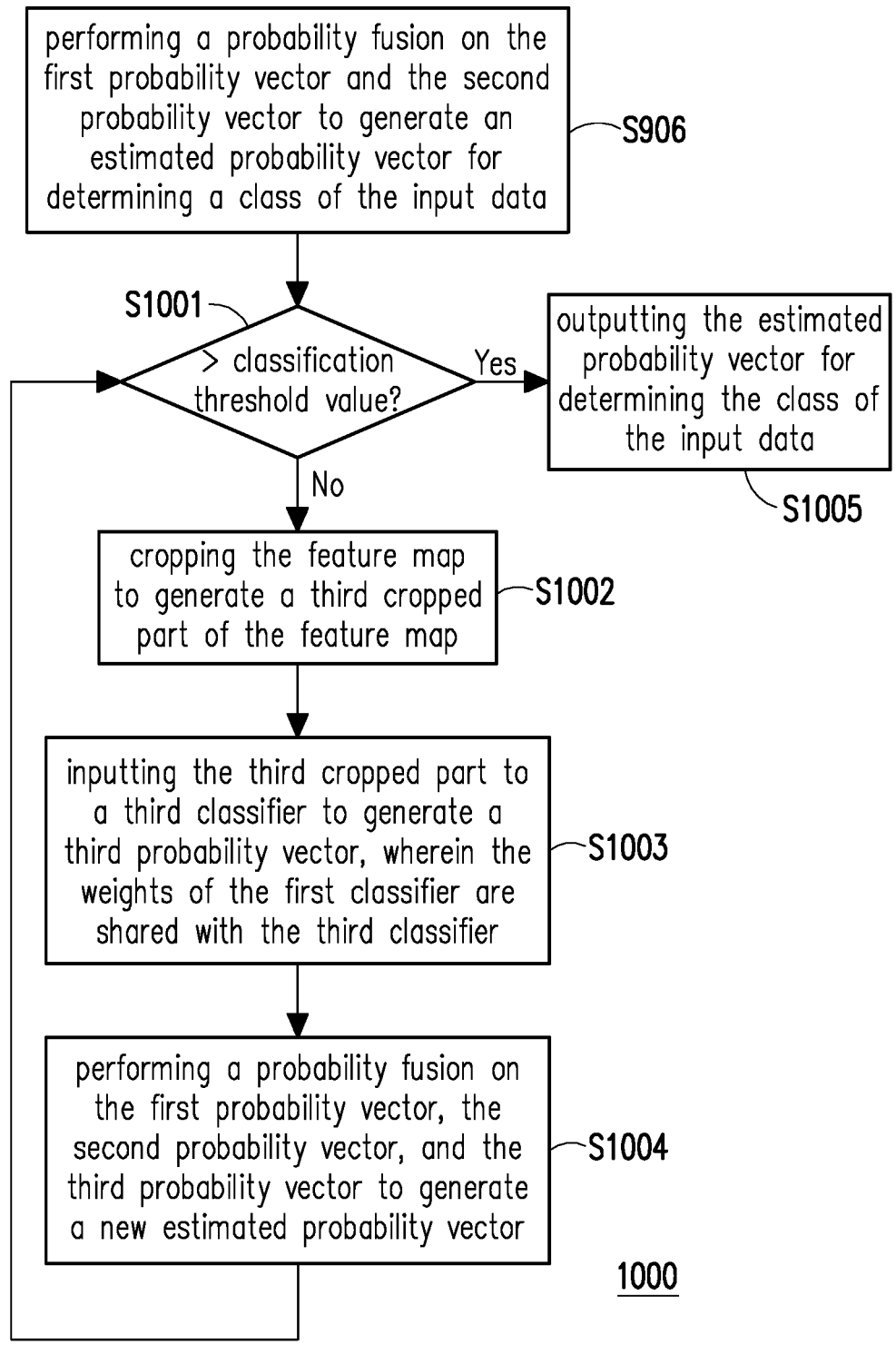
FIG. 10 is a flowchart of a classification method of gradually adding cropped parts according to the classification device of the embodiment of FIG. 8A.

FIG. 10 is a flowchart of a classification method 1000 of gradually adding cropped parts according to the classification device 8 of the embodiment of FIG. 8A. Before step S1001 is performed, steps S901 to S906 of the embodiment of FIG. 9 may be performed to obtain an estimated probability vector corresponding to the first probability vector and the second probability vector. In step S1001, it is compared whether an element greater than a classification threshold value is present in the estimated probability vector. If yes, proceeding to step S1005, the estimated probability vector for determining the class of the input data is output. If no, proceeding to step S1002. In step S1002, the feature map is cropped to generate a third cropped part of the feature map. In step S1003, the third cropped part is input to a third classifier to generate a third probability vector, and the weights of the first classifier are shared with the third classifier. In step S1004, a probability fusion is performed on the first probability vector, the second probability vector, and the third probability vector to update the estimated probability vector. After the estimated probability vector is updated, proceeding to step S1001 again, it is compared whether an element greater than the classification threshold value is present in the estimated probability vector.

Figure 11:
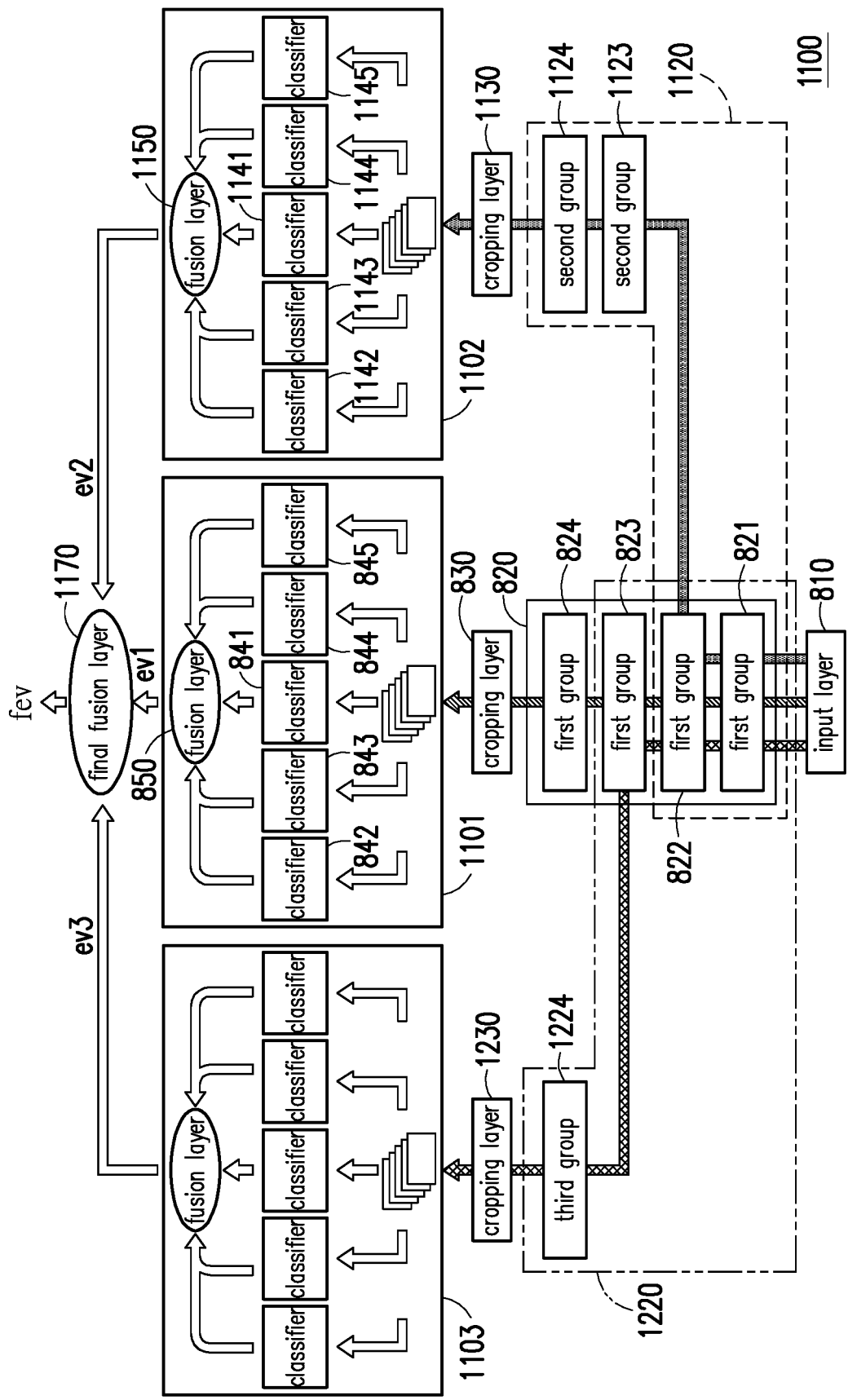
FIG. 11 is a schematic diagram of another storage medium of the classification device according to an embodiment of the disclosure.

In an embodiment, the classification device 8 of the disclosure may also gradually increase the number of neural networks used. FIG. 11 is a schematic diagram of another storage medium 1100 of the classification device 8 according to an embodiment of the disclosure. The storage medium 1100 may include an input layer 810, a neural network 820, a cropping layer 830, a plurality of classifiers (classifiers 841, 842, 843, 844, and 845), and a fusion layer 850. For ease of illustration, all of the elements (including the classifiers 841, 842, 843, 844, and 845 and the fusion layer 850) framed by a block 1101 are collectively referred to as a first module 1101 (as shown in FIG. 8B). The functions of the elements in the first module 1101 have been described in detail in the embodiment of FIG. 8B and are thus not repeatedly described here. People familiar with the related art shall be aware that the input layer 810, the neural network 820, the cropping layer 830, and the classifiers 841 to 845 of the disclosure may also be implemented as hardware circuits instead of being implemented as modules stored in the storage medium 400, and the disclosure is not limited thereto.

In the disclosure, the neural network 820 may be, for example, a convolutional neural network. The neural network 820 may include X first groups formed of layers, and the layers may be convolutional layers of a convolutional neural network. In the present embodiment, the X first groups formed of layers include first groups 821, 822, 823, and 824, wherein the number X of the first groups may be any integer, and the disclosure is not limited thereto. The fusion layer 850 of the first module 1101 may generate a first estimated probability vector ev1 corresponding to the neural network 820. If all elements of the first estimated probability vector ev1 are smaller than the classification threshold value, the classification device 8 (or the storage medium 1100) may increase the neural networks used.

Specifically, the storage medium 1100 may further include a neural network 1120, a cropping layer 1130, a second module 1102, and a final fusion layer 1170. The function and structure of the second module 1102 are the same as those of the first module 1101.

The neural network 1120 may include Y first groups 821 and 822 formed of layers and additional (X-Y) second groups 1123 and 1124 formed of layers. The Y first group 821 and 822 formed of layers are included in the X first group 821, 822, 823, and 824 formed of layers, wherein X>Y≥1, and X and Y are integers. In an embodiment, the Y first groups (e.g., the first groups 821, 822) formed of layers corresponding to the X first groups (e.g., the first groups 821, 822, 823, and 824) formed of layers are the $1^{st}$ group in the X first groups formed of layers to the $Y^{th}$ group in the X first groups formed of layers.

In an embodiment, the total number of layers in the second group (e.g., the second group 1123 or 1124) is different from the total number of layers in the first group (e.g., the first group 821, 822, 823, or 824).

In an embodiment, the total number of layers in the second group (e.g., the second group 1123 or 1124) is smaller than the total number of layers in the first group (e.g., the first group 821, 822, 823, or 824).

In an embodiment, the total number of layers of the $N^{th}$ group (which may be the first group or the second group) in the second neural network (e.g., the neural network 1120) is smaller than the total number of layers of the $N^{th}$ group (which may be the first group or the second group) in the first neural network (e.g., the neural network 820), wherein N>Y, and N is at least one of the integers Y+1, Y+2, . . . , X.

The cropping layer 1130 may receive a second feature map from the neural network 1120 and crop the second feature map to generate a plurality of cropped parts of the second feature map.

The second module 1102 includes a plurality of classifiers (classifiers 1141, 1142, 1143, 1144, and 1145). The classifiers may receive the cropped parts of the second feature map and generate a plurality of probability vectors according to the cropped parts of the second feature map.

The second module 1102 further includes a fusion layer 1150. The fusion layer 1150 may receive the probability vectors from the classifiers (the classifiers 1141, 1142, 1143, 1144, and 1145) to generate a second estimated probability vector ev2.

After the second estimated probability vector ev2 is obtained, the first estimated probability vector ev1 and the second estimated probability vector ev2 are input to the final fusion layer 1170. The final fusion layer 1170 may perform a probability fusion on the first estimated probability vector ev1 and the second estimated probability vector ev2 to generate a final estimated probability vector fev. The probability fusion performed by the final fusion layer 1170 may be, for example, one of a weighted average fusion, a maximum fusion, and a random fusion, and the disclosure is not limited thereto. The final fusion layer 1170 may have the same classification threshold value as the fusion layer 850.

After the final estimated probability vector fev is generated, if all elements of the final estimated probability vector fev are still smaller than the classification threshold value, the classification device 8 (or the storage medium 1100) may further update the final estimated probability vector by adding neural networks (for example, by adding the neural network 1120, the corresponding cropping layer 1230, and a third module 1103, and the function and structure of the third module 1103 are the same as those of the first module 1101), until an element greater than the classification threshold value is present in the final estimated probability vector.

Figure 12:
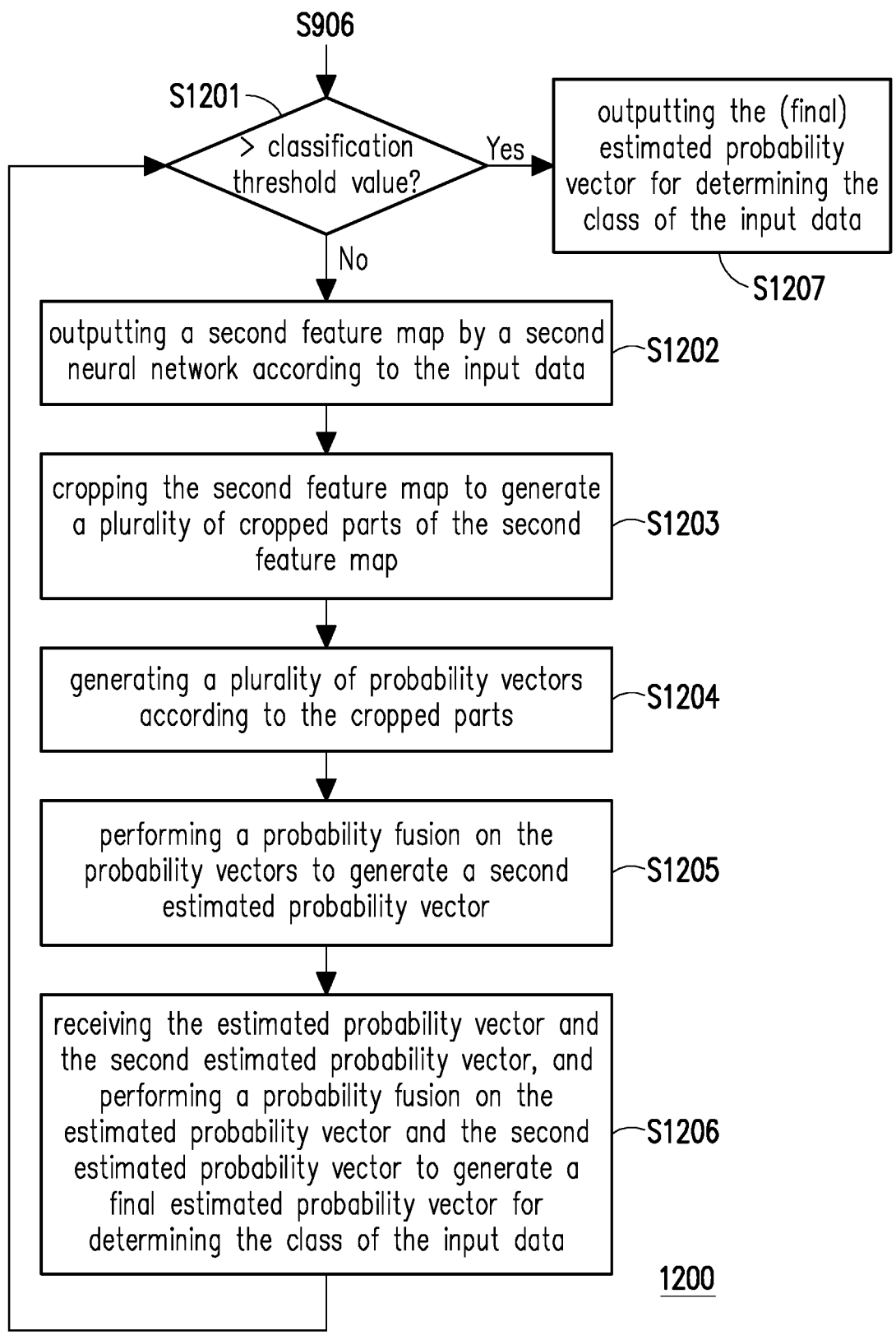
FIG. 12 is a flowchart of a classification method of gradually adding neural networks according to the classification device of the embodiment of FIG. 11.

It is noted that the storage medium 1100 shown in FIG. 11 uses three neural networks (i.e., the neural networks 820, 1120, and 1220), but the number of the neural networks used may be adjusted by the user according to the concept of disclosure. FIG. 12 is a flowchart of a classification method 1200 of gradually adding neural networks according to the storage medium 1100 of the embodiment of FIG. 11. Before step S1201 is performed, steps S901 to S906 of the embodiment of FIG. 9 may be performed to obtain the estimated probability vector corresponding to the first probability vector and the second probability vector. In step S1201, it is compared whether an element greater than the classification threshold value is present in the estimated probability vector. If yes, proceeding to step S1207, the estimated probability vector (e.g., the first probability vector ev1 in FIG. 11) for determining the class of the input data is output. If no, proceeding to step S1202. In step S1202, a second feature map is output by a second neural network according to the input data. In step S1203, the second feature map is cropped to generate a plurality of cropped parts of the second feature map. In step S1204, a plurality of probability vectors are generated according to the cropped parts. In step S1205, a probability fusion is performed on the probability vectors to generate a second estimated probability vector. In step S1206, the estimated probability vector and the second estimated probability vector are received, and a probability fusion is performed on the estimated probability vector and the second estimated probability vector to generate a final estimated probability vector for determining the class of the input data. After the final estimated probability vector is generated, proceeding to step S1201 again, it is compared whether an element greater than the classification threshold value is present in the final estimated probability vector. When an element greater than the classification threshold value is present in the final estimated probability vector, in step S1207, the final estimated probability vector (e.g., the final estimated probability vector fev in FIG. 11) for determining the class of the input data is output.

Figure 13:
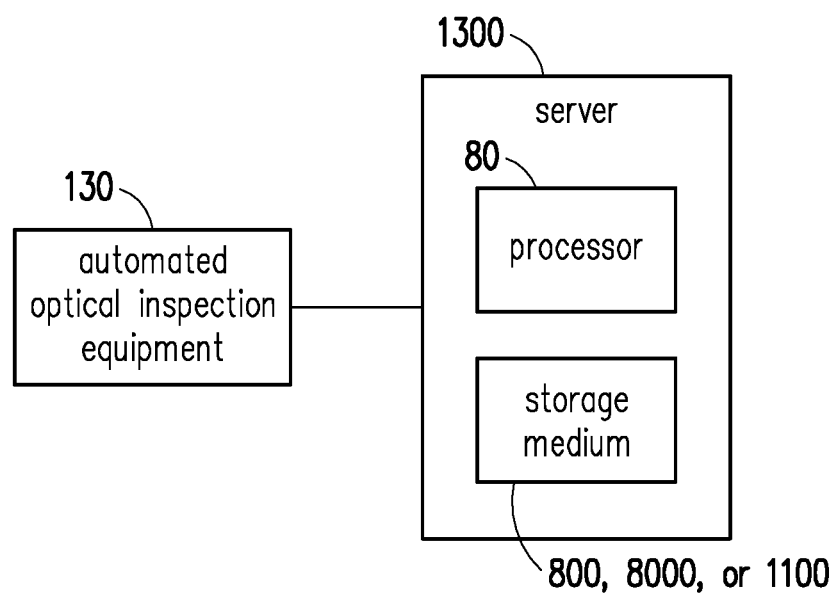
FIG. 13 is a schematic diagram of a neural network-based classification device with a multi-crop framework according to an embodiment of the disclosure.

FIG. 13 is a schematic diagram of a neural network-based classification device 13 with a multi-crop framework according to an embodiment of the disclosure. The classification device 13 is suitable for classifying appearance defects of objects. The classification device 13 may include an automated optical inspection equipment 130 and a server 1300. The automated optical inspection equipment 130 may obtain image data of objects. Depending on the applied scenario, the equipment 130 may also be, for example, an equipment that could obtain image data of objects, such as an automated visual inspection equipment, and the disclosure is not limited thereto. The server 1300 may include a processor 80 and a storage medium 800 (or a storage medium 8000 or 1100). The server 1300 is coupled to the automated optical inspection equipment 130 and receives the image data as input data. The processor 80 and the storage medium 800 (or the storage medium 8000 or 1100) may generate an estimated probability vector for determining the class of the input data according to the input data, as described in the embodiment of FIG. 8B.

The application of the disclosure is extensive. In addition to the application to recognition of general objects or natural images, the disclosure may also be applied to industrial vision (e.g., recognition of product defects, workpiece types, product appearances, etc.), medical diagnosis assistance (e.g., recognition of medical images of benign/malignant tumors, medical images of retinopathy, medical images of lung cancer, etc.), automated optical inspection (AOI), automated visual inspection (AVI), etc. The automated optical inspection involves a high-speed, high-accuracy optical image inspection device that could inspect objects by using "mechanical vision" and could replace human eyes, brain, or manual operations to inspect the quality or defects of products. The AOI technique is a non-contact inspection technique that could inspect the surface state of finished products (e.g., wafers) or semi-finished products in the manufacturing process by using an automated optical inspection equipment, and then detect foreign matter or defects such as pattern abnormalities by using image processing techniques. The AOI technique represents an improvement to the related art where inspection is performed manually by using an optical device.

Table 4, Table 5, and Table 6 show comparisons between the classification device (e.g., the neural network-based classification device 8 with the multi-crop framework) of the disclosure and conventional neural network-based classification devices (baseline).

In Table 4, the neural network model used by the classification devices is ResNet-269-v2. The experimental data set used is ImageNet (ILSVRC-2012) Validation Dataset (50,000 images and 1,000 classes in total). The implementation is based on the deep learning framework Caffe (without re-training the weights of the classifier).

TABLE 4

| Classification device model | Number of crops | Error rate (%) | Test time (ms/image) (averaged over 3 rounds) | Test time (x) (based on 1-crop) | Maximum GPU memory consumption (GB) |
|---|---|---|---|---|---|
| Baseline | 1 | 19.71 | 82.89 | 1.0 x | 2.9 |
| Baseline (repeated 12 times) | 12 | 18.25 | 994.68 | 12.0 x | 2.9 |
| Classification device of disclosure | 12 | 18.18 | 107.66 | 1.30 x | 6.1 |

Experimental conditions: WinServer-2012, CUDA8.0, cuDNN 6.0, Titan-X-Pascal, Mini-batch = 1, Keep Aspect Ratio In Table 5, the neural network model used by the classification devices is ResNetXt-101-64x4d. The experimental data set used is ImageNet (ILSVRC-2012) Validation Dataset (50,000 images and 1,000 classes in total). The implementation is based on the deep learning framework Caffe (without re-training the weights of the classifier).

TABLE 5

| Classification device model | Number of crops | Error rate (%) | Test time (ms/image) (averaged over 3 rounds) | Test time (x) (based on 1-crop) | Maximum GPU memory consumption (GB) |
|---|---|---|---|---|---|
| Baseline | 1 | 20.60 | 60.02 | 1.0 x | 5.5 |
| Baseline (repeated 12 times) | 12 | 18.88 | 720.24 | 12.0 x | 5.5 |
| Classification device of disclosure | 12 | 18.89 | 81.78 | 1.36 x | 7.6 |

Experimental conditions: WinServer-2012, CUDA8.0, cuDNN 6.0, Titan-X-Pascal, Mini-batch = 1, Keep Aspect Ratio In Table 6, the neural network model used by the classification devices is Inception-v4. The experimental data set used is ImageNet (ILSVRC-2012) Validation Dataset (50, 000 images and 1,000 classes in total). The implementation is based on the deep learning framework Caffe (without re-training the weights of the classifier).

TABLE 6

| Classification device model | Number of crops | Error rate (%) | Test time (ms/image) (averaged over 3 rounds) | Test time (x) (based on 1-crop) | Maximum GPU memory consumption (GB) |
| --- | --- | --- | --- | --- | --- |
| Baseline | 1 | 20.03 | 54.12 | 1.0 x | 1.1 |
| Baseline (repeated 12 times) | 12 | 18.60 | 649.44 | 12.0 x | 1.1 |
| Classification device of disclosure | 12 | 18.49 | 63.85 | 1.18 x | 2.0 |

Experimental conditions: WinServer-2012, CUDA8.0, cuDNN 6.0, Titan-X-Pascal, Mini-batch = 1, Keep Aspect Ratio The classification device of the disclosure may also be used to recognize industrial vision data sets. Table 7 shows a comparison between the classification device (e.g., the neural network-based classification device 8 with the multi-crop framework) of the disclosure and a conventional neural network-based classification device (baseline). In Table 7, the neural network model used by the classification devices is DFB-WideResNet-3-Branch. The experimental data set used is "Dataset_DS_180112-R5" (appearance images of dynamic random access memory (DRAM) wafers, as shown in Table 8). The implementation is based on the deep learning framework Caffe (without re-training the weights of the classifier).

TABLE 7

| Cropping method | Error rate (%) |
| --- | --- |
| 1-crop (baseline) | 3.00 |
| 6-crop | 2.85 |

TABLE 8

| Label type | Number of training sets | Number of validation sets | Number of test sets | Total |
| --- | --- | --- | --- | --- |
| Scratch | 985 | 212 | 230 | 1427 |
| Arrow | 565 | 125 | 122 | 812 |
| Particle | 2012 | 399 | 430 | 2841 |
| Discoloring | 5493 | 1187 | 1152 | 7832 |
| Normal | 386 | 77 | 66 | 529 |
| Total | 9441 | 2000 | 2000 | 13441 |

In summary of the above, the classification device of the disclosure could improve the classification error rate by slightly increasing the computational capacity without re-training the neural network model. The classification device could enhance the diversity of the input data by cropping the feature map without increasing the input data to improve the error rate of the classification performed by using the neural network. Through the weight sharing mechanism, when a trained neural network and its classifier are applied to the classification device with multi-crop properties of the disclosure, it is not required to re-train the neural network and its classifier. Accordingly, the time cost for training could be reduced. On the other hand, the classification device could also increase the cropped parts of the feature map when the classification result is insignificant to gradually improve the classification result until an element in the estimated score vector is greater than the classification threshold value. In addition, the classification device could also improve the classification error rate by adding neural network branches.

Although the disclosure has been disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:

1. A neural network-based classification device, comprising:
   a storage medium, storing a plurality of modules; and
   a processor coupled to the storage medium, the processor accessing and executing the modules of the storage medium, wherein the modules comprise:
   a neural network, generating a feature map according to input data;
   a cropping layer, cropping the feature map to generate a first cropped part and a second cropped part of the feature map;
   a first classifier, generating a first probability vector according to the first cropped part;
   a second classifier, generating a second probability vector according to the second cropped part, wherein weights of the first classifier are shared with the second classifier; and
   a fusion layer, performing a probability fusion on the first probability vector and the second probability vector to generate an estimated probability vector for determining a class of the input data,
   wherein if all elements of the estimated probability vector are smaller than a classification threshold value, the cropping layer crops the feature map to generate a third cropped part of the feature map, and the modules further comprise:
   a third classifier, generating a third probability vector according to the third cropped part, wherein
   the weights of the first classifier are shared with the third classifier, and
   the fusion layer performs a probability fusion on the first probability vector, the second probability vector, and the third probability vector to generate a second estimated probability vector for determining the class of the input data.

2. The classification device according to claim 1, wherein the neural network is a convolutional neural network.

3. The classification device according to claim 2, wherein the neural network comprises X first groups formed of layers, and the modules further comprise:
   a second neural network comprising Y first groups formed of layers and additional (X-Y) second groups formed of layers, wherein the Y first groups formed of layers are included in the X first groups formed of layers, X>Y≥1, and X and Y are integers.

4. The classification device according to claim 3, wherein the Y first groups formed of layers corresponding to the X first groups formed of layers are a $1^{st}$ group in the X first groups formed of layers to a $Y^{th}$ group in the X first groups formed of layers.

5. The classification device according to claim 3, wherein if all elements of the estimated probability vector are smaller than the classification threshold value, the second neural network outputs a second feature map according to the input data, and the modules further comprise:
  a second cropping layer, cropping the second feature map to generate a plurality of cropped parts of the second feature map;
  a plurality of classifiers, generating a plurality of probability vectors according to the cropped parts;
  a second fusion layer, performing a probability fusion on the probability vectors to generate a second estimated probability vector; and
  a final fusion layer, performing a probability fusion on the estimated probability vector and the second estimated probability vector to generate a final estimated probability vector for determining the class of the input data.

6. The classification device according to claim 1, wherein the operation of sharing the weights of the first classifier with the second classifier comprises:
  applying weights identical to the weights of the first classifier to the second classifier.

7. The classification device according to claim 1, wherein the first classifier comprises:
  a pooling layer, receiving the first cropped part of a plurality of channels to generate a plurality of feature points respectively corresponding to the channels;
  a classification layer, converting the feature points into a score vector, wherein each element in the score vector corresponds to a class; and
  a softmax function layer, normalizing the score vector to generate the first probability vector, wherein each element in the first probability vector corresponds to a class.

8. The classification device according to claim 1, wherein the fusion layer performs the probability fusion according to one of the following:
  method 1: taking an average of the first probability vector and the second probability vector by using a same weight coefficient to generate the estimated probability vector;
  method 2: taking an average of the first probability vector and the second probability vector by using different weight coefficients to generate the estimated probability vector;
  method 3: selecting an element having a maximum value from the first probability vector and the second probability vector, and determining a probability vector corresponding to the element as the estimated probability vector;
  method 4: randomly selecting one of the first probability vector and the second probability vector as the estimated probability vector; and
  method 5: randomly discarding a predetermined number of second elements in the first probability vector and the second probability vector, and then performing one of method 1 to method 4, wherein the predetermined number of the second elements respectively correspond to one of a plurality of classes.

9. The classification device according to claim 1, wherein the input data comprises image data and mirrored image data of the image data.

10. The classification device according to claim 9, wherein the image data and the mirrored image data are concatenated into new input data.

11. A neural network-based classification method, comprising:
  obtaining a neural network and a first classifier;
  inputting input data to the neural network to generate a feature map;
  cropping the feature map to generate a first cropped part and a second cropped part of the feature map;
  inputting the first cropped part to the first classifier to generate a first probability vector;
  inputting the second cropped part to a second classifier to generate a second probability vector, wherein weights of the first classifier are shared with the second classifier; and
  performing a probability fusion on the first probability vector and the second probability vector to generate an estimated probability vector for determining a class of the input data,
  wherein if all elements of the estimated probability vector are smaller than a classification threshold value, the classification method further comprises:
    cropping the feature map to generate a third cropped part of the feature map;
    inputting the third cropped part to a third classifier to generate a third probability vector, wherein the weights of the first classifier are shared with the third classifier; and
    perfoming a probability fusion on the first probability vector, the second probability vector, and the third probability vector to generate a second estimated probability vector for determining the class of input data.

12. The classification method according to claim 11, wherein the neural network is a convolutional neural network.

13. The classification method according to claim 12, wherein the neural network comprises X first groups formed of layers, and the classification method further comprises:
  obtaining a second neural network comprising Y first groups formed of layers and additional (X-Y) second groups formed of layers, wherein the Y first groups formed of layers are included in the X first groups formed of layers, $X>Y \geq 1$, and X and Y are integers.

14. The classification method according to claim 13, wherein the Y first groups formed of layers corresponding to the X first groups formed of layers are a $1^{st}$ group in the X first groups formed of layers to a $Y^{th}$ group in the X first groups formed of layers.

15. The classification method according to claim 13, wherein if all elements of the estimated probability vector are smaller than the classification threshold value, the classification method further comprises:
  inputting the input data to the second neural network to generate a second feature map;
  cropping the second feature map to generate a plurality of cropped parts of the second feature map;
  inputting the cropped parts to a plurality of classifiers to generate a plurality of probability vectors;
  performing a probability fusion on the probability vectors to generate a second estimated probability vector; and
  performing a probability fusion on the estimated probability vector and the second estimated probability vector to generate a final estimated probability vector for determining the class of the input data.

16. The classification method according to claim 11, wherein the step of sharing the weights of the first classifier with the second classifier comprises:

applying weights identical to the weights of the first classifier to the second classifier.

17. The classification method according to claim 11, wherein the first classifier comprises:

a pooling layer, receiving the first cropped part of a plurality of channels to generate a plurality of feature points respectively corresponding to the channels;

a classification layer, converting the feature points into a score vector, wherein each element in the score vector corresponds to a class; and a softmax function layer, normalizing the score vector to generate the first probability vector, wherein each element in the first probability vector corresponds to a class.

18. The classification method according to claim 11, wherein the probability fusion comprises one of the following:

method 1: taking an average of the first probability vector and the second probability vector by using a same weight coefficient to generate the estimated probability vector;

method 2: taking an average of the first probability vector and the second probability vector by using different weight coefficients to generate the estimated probability vector;

method 3: selecting an element having a maximum value from the first probability vector and the second probability vector, and deteiiiiiining a probability vector corresponding to the element as the estimated probability vector;

method 4: randomly selecting one of the first probability vector and the second probability vector as the estimated probability vector; and method 5: randomly discarding a predetermined number of second elements in the first probability vector and the second probability vector, and then performing one of method 1 to method 4, wherein the predetermined number of the second elements respectively correspond to one of a plurality of classes.

19. The classification method according to claim 11, wherein the input data comprises image data and mirrored image data of the image data.

20. The classification method according to claim 19, wherein the image data and the mirrored image data are concatenated into new input data.

21. A neural network-based classification device suitable for classifying appearance defects of objects, the classification device comprising:

an automated optical inspection equipment, obtaining image data of the objects; and a server comprising a storage medium and a processor, the server being coupled to the automated optical inspection equipment and receiving the image data, wherein the storage medium stores a plurality of modules, and the processor is coupled to the storage medium and accesses and executes the modules of the storage medium, the modules comprising:

a neural network, generating a feature map according to the image data;

a cropping layer, cropping the feature map to generate a first cropped part and a second cropped part of the feature map;

a first classifier, generating a first probability vector according to the first cropped part;

a second classifier, generating a second probability vector according to the second cropped part, wherein weights of the first classifier are shared with the second classifier; and a fusion layer, performing a probability fusion on the first probability vector and the second probability vector to generate an estimated probability vector for determining a class of the image data, wherein if all elements of the estimated probability vector are smaller than a classification threshold value, the cropping layer crops the feature map to generate a third cropped part of the feature map, and the modules further comprises:

a third classifier, generating a third probability vector according to the third cropped part, wherein the weights of the first classifier are shared with the third classifier, and the fusion layer preforms a probability fusion on the first probability vector, the second probability vector, and the third probability vector to generate a second estimated probability vector for determining the class of the image data.

* * * * *